(12) United States Patent
Golden et al.

(10) Patent No.: US 10,147,123 B2
(45) Date of Patent: Dec. 4, 2018

(54) ELECTRONIC MARKETPLACE FOR HOSTED SERVICE IMAGES

(75) Inventors: Manine R. Golden, Seattle, WA (US); David Zipkin, Seattle, WA (US); John Daniel Thimsen, Seattle, WA (US); Andrew S. Tyra, Seattle, WA (US); Terrance D. Hanold, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 415 days.

(21) Appl. No.: 13/248,227

(22) Filed: Sep. 29, 2011

(65) Prior Publication Data
US 2013/0085892 A1 Apr. 4, 2013

(51) Int. Cl.
G06F 21/10 (2013.01)
G06Q 30/06 (2012.01)

(52) U.S. Cl.
CPC .................................. G06Q 30/06 (2013.01)

(58) Field of Classification Search
USPC ........... 705/57, 40; 717/120; 709/218; 718/1
See application file for complete search history.

(56) References Cited

U.S. PATENT DOCUMENTS

| | | | |
|---|---|---|---|
| 4,788,637 A | 11/1988 | Tamaru | |
| 5,757,908 A | 5/1998 | Cooper et al. | |
| 5,870,717 A * | 2/1999 | Wiecha | 705/26.81 |
| 6,664,981 B2 | 12/2003 | Ashe et al. | |
| 6,735,768 B1 | 5/2004 | Tanaka | |
| 6,910,071 B2 | 6/2005 | Quintero et al. | |
| 7,165,041 B1 | 1/2007 | Guheen et al. | |
| 7,315,830 B1 | 1/2008 | Wirtz et al. | |
| 7,324,969 B2 | 1/2008 | Pallister et al. | |
| 7,433,835 B2 | 10/2008 | Frederick et al. | |
| 7,466,835 B2 | 12/2008 | Stenberg et al. | |
| 7,467,206 B2 | 12/2008 | Moore et al. | |

(Continued)

FOREIGN PATENT DOCUMENTS

| | | |
|---|---|---|
| CA | 2554462 | 8/2005 |
| CN | 103959317 A | 7/2014 |

(Continued)

OTHER PUBLICATIONS

Managed Hosting Services on Dedicated Infrastructure (Year: 2009).*

(Continued)

*Primary Examiner* — James M Detweiler
*Assistant Examiner* — Tarek Elchanti
(74) *Attorney, Agent, or Firm* — Knobbe, Martens, Olson & Bear, LLP

(57) ABSTRACT

Systems and methods are disclosed which facilitate providing a marketplace for acquisition of service images to be executed in a hosted computing environment. Service image providers submit service images for inclusion in the service image marketplace. Providers may further specify pricing and usage conditions associated with the service images. Customers browse and select service images for hosting on either the marketplace hosted computing environment, or an alternate hosted computing environment. If necessary, customers may submit payment information. The service image marketplace may monitor usage of hosted service images and bill customers according to use.

24 Claims, 12 Drawing Sheets

(56) References Cited

U.S. PATENT DOCUMENTS

| | | |
|---|---|---|
| 7,729,954 B2 | 6/2010 | Frederick et al. |
| 7,729,955 B2 | 6/2010 | Frederick et al. |
| 7,747,644 B1 | 6/2010 | Reihl et al. |
| 7,778,874 B1 | 8/2010 | Saunders |
| 7,797,198 B1 | 9/2010 | Frederick et al. |
| 7,797,271 B1 | 9/2010 | Bonneau et al. |
| 7,801,771 B1 | 9/2010 | Sirota et al. |
| 7,908,358 B1 | 3/2011 | Prasad et al. |
| 7,953,642 B2 | 5/2011 | Dierks |
| 7,958,529 B2 * | 6/2011 | Green et al. ............... 725/60 |
| 8,005,723 B1 | 8/2011 | Sirota et al. |
| 8,019,652 B1 | 9/2011 | Frederick et al. |
| 8,019,653 B1 | 9/2011 | Frederick et al. |
| 8,019,660 B2 | 9/2011 | Westphal |
| 8,024,225 B1 | 9/2011 | Sirota et al. |
| 8,185,220 B2 | 5/2012 | Lloyd |
| 8,442,234 B2 | 5/2013 | Brown et al. |
| 8,543,931 B2 | 9/2013 | Forstall et al. |
| 8,601,583 B1 | 12/2013 | Chandrasekhar et al. |
| 9,288,117 B1 | 3/2016 | Angrish et al. |
| 9,530,156 B2 | 12/2016 | Tyra et al. |
| 2002/0085037 A1 | 7/2002 | Leavitt et al. |
| 2002/0120461 A1 | 8/2002 | Kirkconnell-Ewing et al. |
| 2002/0120519 A1 | 8/2002 | Martin et al. |
| 2003/0195813 A1 | 10/2003 | Pallister et al. |
| 2003/0217357 A1 | 11/2003 | Parry |
| 2004/0122926 A1 | 6/2004 | Moore et al. |
| 2004/0243583 A1 | 12/2004 | Olsen |
| 2005/0010916 A1 | 1/2005 | Hagen et al. |
| 2005/0039034 A1 | 2/2005 | Doyle et al. |
| 2005/0256882 A1 | 11/2005 | Able et al. |
| 2006/0085785 A1 | 4/2006 | Garrett |
| 2007/0022447 A1 | 1/2007 | Arseneau et al. |
| 2007/0067297 A1 | 3/2007 | Kublickis |
| 2007/0118530 A1 | 5/2007 | Chow et al. |
| 2007/0130156 A1 | 6/2007 | Tenhunen et al. |
| 2007/0233540 A1 | 10/2007 | Sirota |
| 2007/0294399 A1 | 12/2007 | Grossner et al. |
| 2008/0080396 A1 | 4/2008 | Meijer et al. |
| 2008/0098462 A1 | 4/2008 | Carter |
| 2008/0103975 A1 * | 5/2008 | Taratino et al. ............... 705/57 |
| 2009/0037337 A1 | 2/2009 | Baitalmal et al. |
| 2009/0037492 A1 | 2/2009 | Baitalmal et al. |
| 2009/0100331 A1 | 4/2009 | Sauve et al. |
| 2009/0119779 A1 | 5/2009 | Dean et al. |
| 2009/0138380 A1 | 5/2009 | Roseman et al. |
| 2009/0235244 A1 | 9/2009 | Enomori et al. |
| 2009/0241037 A1 | 9/2009 | Hyndman |
| 2009/0249324 A1 | 10/2009 | Brar et al. |
| 2009/0288082 A1 | 11/2009 | Nazeer et al. |
| 2010/0114739 A1 | 5/2010 | Johnston |
| 2010/0131084 A1 | 5/2010 | Van Camp |
| 2010/0262508 A1 | 10/2010 | Volnak |
| 2010/0306767 A1 * | 12/2010 | Dehaan ............... G06F 9/5077 718/1 |
| 2011/0119191 A1 | 5/2011 | Stern et al. |
| 2011/0126110 A1 | 5/2011 | Vilke et al. |
| 2011/0173028 A1 | 7/2011 | Bond |
| 2011/0214124 A1 | 9/2011 | Ferris et al. |
| 2012/0054731 A1 | 3/2012 | Aravamudan et al. |
| 2012/0278229 A1 * | 11/2012 | Vishwanathan ...... G06Q 20/123 705/40 |
| 2012/0278439 A1 * | 11/2012 | Ahiska ............... H04L 67/2852 709/218 |
| 2013/0085899 A1 | 4/2013 | Tyra et al. |
| 2014/0109046 A1 * | 4/2014 | Hirsch ............... G06F 9/44 717/120 |

FOREIGN PATENT DOCUMENTS

| | | |
|---|---|---|
| CN | 104115177 A | 10/2014 |
| EP | 2761555 A | 8/2014 |
| EP | 2761558 A | 8/2014 |
| GB | 2426362 | 11/2006 |
| JP | 2003-44602 | 2/2003 |
| JP | 2007-149096 A | 6/2007 |
| JP | 2010-277187 A | 12/2010 |
| JP | 4743726 B1 | 8/2011 |
| WO | WO 2005/072342 A2 | 8/2005 |
| WO | WO 2013/049393 | 4/2013 |
| WO | WO 2013/049395 | 4/2013 |
| WO | WO-2013049395 A1 * | 4/2013 ............... G06Q 30/06 |

OTHER PUBLICATIONS

Ebay, Inc.; Ebay Advertising Targeting homepage. 2012. Accessed Feb. 17, 2012. http://www.ebayadvertising.com/en/display-ads-targeting. 1 pg.

Anand Ranganathan et al., Advertising in a Pervasive Computing Environment, University of Illinois, 5 pages, Urbana, IL.

International Search Report and Written Opinion in PCT/US2012/057626 dated Dec. 24, 2012.

International Search Report and Written Opinion in PCT/US2012/057624 dated Dec. 6, 2012.

Nakata, A., Close up, Nikkei computer, No. 789, Nikkei Business Publications, Inc., Aug. 18, 2011, pp. 68-75.

Shimizu, M., EC2/S3/EBS, Virtual Server Construction by Cloud Computing, 1st ed., Socym Co., Ltd., Shoichiro Takeda, Aug. 27, 2009, pp. 128-138.

International Preliminary Report on Patentability received in PCT/US2012/057624 dated Apr. 1, 2014.

Supplementary Search Report received in European Application No. 12834770.5 dated Apr. 10, 2015.

Office Action received in Japanese Application No. 2014-533330 dated Mar. 2, 2015.

Office Action received in Australian Application No. 2012315939 dated Mar. 10, 2015.

Office Action received in Singapore Application No. 2014012645 dated Mar. 27, 2015.

Office Action received in Canadian Application No. 2850008 dated May 19, 2015.

Supplementary Search Report received in European Application No. 12835825.6 dated Jul. 14, 2015.

Office Action received in Canadian Application No. 2,850,011 dated Sep. 1, 2015.

Office Action received in Japanese Application No. 2014-533331 dated Sep. 3, 2015.

Doumae, K. Cloud in Japan—II Probation into Ability of GIO, Chapter 1—Cloud in Japan and IIJ GIO, G-Cloud Magazine, Japan, K.K. Gijutsu Hyoronsha, Sep. 10, 2010, pp. 100-101.Sep. 10, 2010; pp. 100-101.

Taniguchi, T., Cloud in Japan—II Probation into Ability of GIO, Chapter 2—Using IIJ Cloud: It's Simple! Establishing the Web Server by Using the GIO Hosting Package, G-Cloud Magazine, Japan, K.K. Gijutsu Hyoronsha, Sep. 10, 2010, pp. 102 109.

Taniguchi, T., Cloud in Japan—II Probation into Ability of GIO, Chapter 3—Full-Scale! Example of Structuring Using GIO Component Service—Encouraging Full-Scale Cloud Infrastructure with Parts Selected and Used, G-Cloud Magazine, Japan, K.K. Gijutsu Hyoronsha, Sep. 10, 2010, pp. 110 117.

Office Action received in Australian Application No. 2012315941 dated Mar. 10, 2015.

Office Action received in Japanese Application No. 2014-533331 dated Feb. 23, 2015.

Notification of Grant received in Singapore Application No. 2014012645 dated Feb. 26, 2015.

Office Action received in Australian Application No. 2012315939 dated May 19, 2015.

Office Action received in Chinese Application No. 201280047426.1 dated Apr. 29, 2016.

Office Action received in Chinese Application No. 201280047426.1 dated Nov. 24, 2016. English Translation Not Yet Received.

Office Action received in Russian Application No. 2014117208 dated Nov. 30, 2015.

(56) References Cited

OTHER PUBLICATIONS

Office Action in Chinese Application No. 2012800472374 dated Aug. 23, 2016. English Translation Not Yet Received.

* cited by examiner

ELECTRONIC MARKETPLACE FOR HOSTED SERVICE IMAGES

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit, of the general public.

To facilitate increased utilization of data center resources, virtualization technologies allow a single physical computing device to host one or more instances of a virtual machine, which virtual machine instance appears to a user of a data center as an independent computing device. With virtualization, the host computing device can create, maintain, delete, or otherwise manage virtual machines instances in a dynamic manner. In turn, users can request computing resources from the data center, including single computing devices or a configuration of networked computing devices, and be provided with virtual machine instances that provide the requested computing resources.

An instance of a virtual machine may be configured to provide specific functionality. For example, a virtual machine instance may be associated with different combinations of software applications and operating systems or operating system configurations to enable a virtual machine to provide different desired functionalities, or to provide similar functionalities more efficiently. One or more virtual machine instance configurations are often contained within a service image, which a host computing device may execute in order to implement the desired specific functionality of the virtual machine instance.

In one embodiment, the service image, when executed by virtual machine instance, provides a network accessible service (a.k.a. Web service) corresponding to the software applications/configurations included in the service image. A network accessible service provides specific functionality to other applications and computing resources via a network through application programming interfaces (APIs), which APIs can also be considered a network accessible service or Web service. For example, a service image, when executed, may provide a network accessible database or mass storage service. Once a service image is created, it can be provided to users interested in utilizing computing resources available from a data center for specific purposes.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
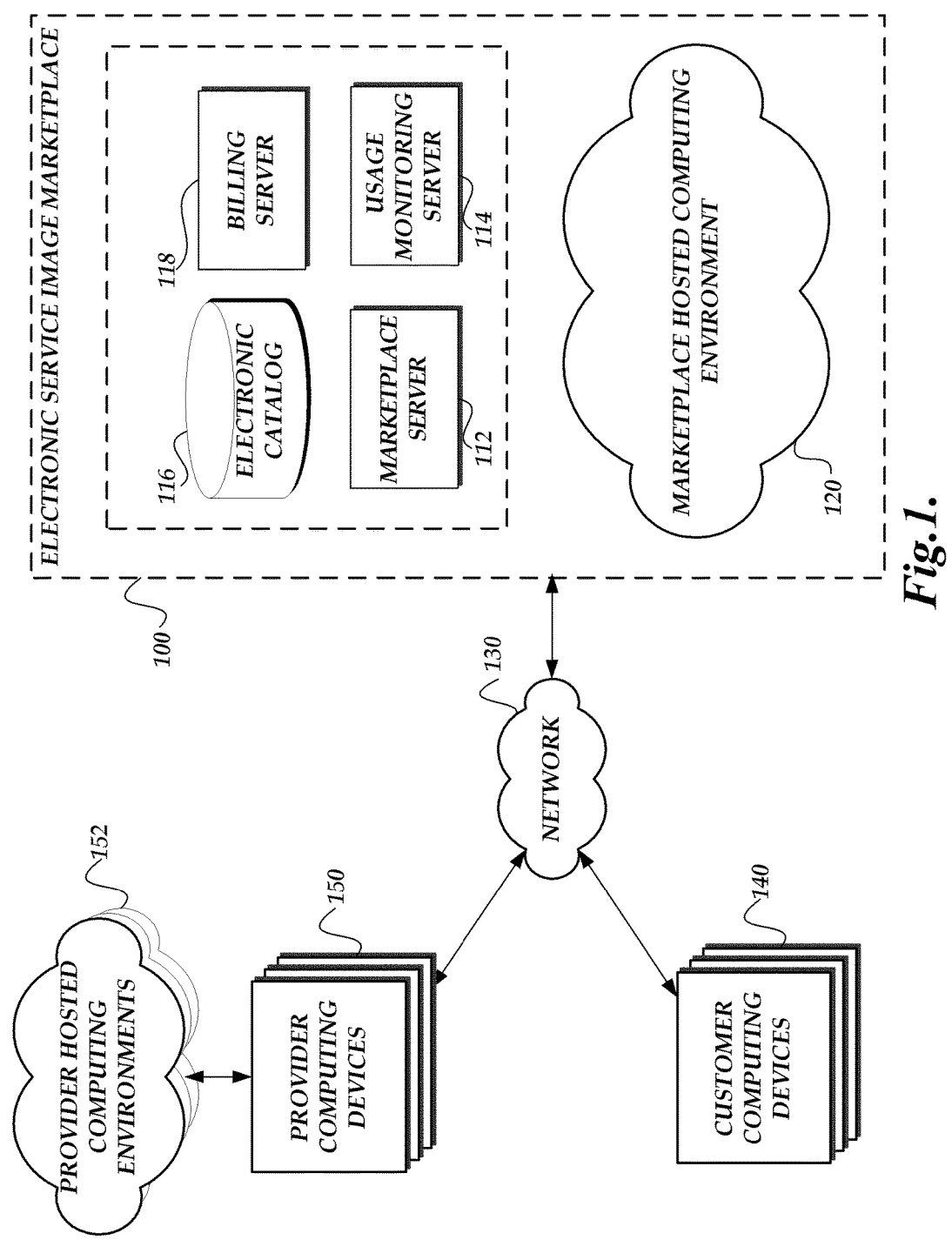
FIG. 1 is a block diagram depicting an illustrative operating environment in which an electronic service image marketplace enables customers to browse and acquire service images made available in the marketplace by third party providers and the operator of the electronic marketplace.

Generally described, aspects of the present disclosure relate to providing an electronic marketplace for service images. More specifically, an electronic service image marketplace is disclosed that enables customers to browse and acquire a large variety of service images. The service images may be submitted to, and made available from, the electronic service image marketplace, by third party providers or may be submitted to the marketplace by the operator of the marketplace itself. Once acquired through the marketplace, a service image may be launched on a hosted computing environment maintained by the third party provider of the service image or on a hosted computing environment associated with the marketplace.

The electronic service image marketplace provides an environment with which both providers and customers of service images can interact via a network. In one embodiment, a provider may submit a service image to the service image marketplace for inclusion in a service image catalog. The provider may submit additional information corresponding to the service image that would be useful to a customer, such as pricing information, usage conditions, a location of a provider hosted computing environment on which the service image can be hosted, or other information. Customers may browse the service image catalog by interaction with various user interfaces generated by the service image marketplace as described in more detail below. Upon identifying a service image of interest, the customer may view details of each service image in the service image catalog, such as the information submitted by the provider of the service image. In some embodiments, a customer may view further information associated with a service image, such as usage statistics by other marketplace customers of the service image, reviews by other customers, or recommendations for similar or complementary service images. Accordingly, service images may be surfaced to customers in a variety of ways by the electronic service image marketplace, such as by navigation through a browse tree of services organized by function, type, size, etc. or through recommendations, reviews, etc.

Once a customer selects a service image, the customer may purchase or otherwise acquire the service from the service image marketplace. In some embodiments, the customer may be required to submit payment information for the service image prior to launch of the service image. After acquisition of the service image by the customer, the service image may be launched and executed by one or more hosted computing environments. The hosted computing environment may be provided by an operator of the service image marketplace or may be otherwise associated with the electronic service image marketplace. In some embodiments, the third party provider of the acquired service image may provide a hosted computing environment for the service image acquired by the customer via the electronic service image marketplace.

Once the service image is launched and running on a hosted computing environment, the electronic service image marketplace can monitor the usage of functionality or services provided by service image and bill the customer/pay the provider accordingly. Moreover, the electronic service image marketplace may provide the customer with tools to manage, monitor, modify, etc. the service image.

Embodiments discussed below may refer to the users of an electronic marketplace for service images as customers. However, it may be understood that users are not limited to customers but may include owners, administrators, end users and providers of service images purchased from the electronic marketplace. While specific embodiments and example applications of the present disclosure will now be described with reference to the drawings, these embodiments and example applications are intended to illustrate, and not limit, the present disclosure.

FIG. 1 is a block diagram depicting an illustrative operating environment in which an electronic service image marketplace 100 enables customers to browse and acquire service images made available in the marketplace by third party providers or the operator of the electronic marketplace. As illustrated in FIG. 1, the operating environment includes one or more provider computing devices 150 and one or more customer computing devices 140 in communication with an electronic service image marketplace 100 via a network 130. A third party provider, using a provider computing device 150, may submit via the network 130 a service image for a specific type of functionality to the electronic service image marketplace 100. The electronic service image marketplace 100 may then make the submitted service image, as well as other service images submitted to the marketplace, available to customers. Accordingly, a customer, using a computing device 140, may browse the service images available from the electronic service image marketplace 100, acquire a desired service image, and launch the acquired service image in a marketplace hosted computing environment 120 operated, maintained, provided or otherwise associated with the operator of the electronic service image marketplace 100. In some cases, where the acquired service image was submitted to the electronic service image marketplace 100 by a third party provider, the acquired service image may be launched in a provider hosted computing environment 152 that is operated, maintained, provided or otherwise associated with the third party provider. A hosted computing environment may include a collection of rapidly provisioned and released computing resources hosted in connection with the marketplace or a third party provider. The computing resources may include a number of computing, networking and storage devices in communication with one another. In some embodiments, the computing devices may correspond to physical computing devices. In other embodiments, the computing devices may correspond to virtual machine instances implemented by one or more physical computing devices. In still other embodiments, computing devices may correspond to both virtual computing devices and physical computing devices. One example of a hosted computing environment is given in U.S. Pat. No. 7,865,586, issued on Jan. 4, 2011 and entitled "Configuring Communications Between Computing Nodes" which is hereby incorporated by reference in its entirety. A hosted computing environment may also be referred to as a cloud computing environment.

Though described herein with reference to hosted computing environments associated with a provider of a service image and with the electronic service image marketplace 100, in some embodiments, additional hosted computing environments may be utilized. For example, a customer computing device 140 may provide a customer hosted computing environment (not shown), or a third party may provide a third party hosted computing environment (not shown). Any or all of these additional hosted computing environments may be accessible to the electronic service image marketplace 100, and may be utilized to host service images available from the electronic service image marketplace 100. For purposes of brevity, such additional hosted computing environments may also be referred to herein as "provider hosted computing environments."

The provider computing devices 150 and the customer computing devices 140 may communicate with the electronic service image marketplace 100 via a network 130. A provider computing device 150 or customer computing device 140 may be any computing device, such as a laptop or tablet computer, personal computer, server, personal digital assistant (PDA), hybrid PDA/mobile phone, mobile phone, electronic book reader, set-top box, camera, digital media player, and the like. Those skilled in the art will appreciate that the network 130 may be any wired network, wireless network or combination thereof. In addition, the network 130 may be a personal area network, local area network, wide area network, cable network, satellite network, cellular telephone network, or combination thereof. In the illustrated embodiment, the network 130 is the Internet. Protocols and components for communicating via the Internet or any of the other aforementioned types of communication networks are well known to those skilled in the art of computer communications and thus, need not be described in more detail herein.

In the illustrated embodiment, the electronic service image marketplace 100 is illustrated as a computer environment including several computer systems that are interconnected using one or more networks. More specifically, the service image marketplace may include a marketplace server 112, a usage monitoring server 114, an electronic catalog 116, and a billing server 118. Each of these will be described in more detail below. However, it will be appreciated by those skilled in the art that the electronic service image marketplace 100 could have fewer or greater components than are illustrated in FIG. 1. In addition, the electronic service image marketplace 100 could include various Web services and/or peer-to-peer network configurations. Thus, the depiction of the electronic service image marketplace 100 in FIG. 1 should be taken as illustrative and not limiting to the present disclosure.

The marketplace server 112 facilitates network submission by third party providers, and browsing and acquisition by customers, of service images in the electronic service image marketplace 100. Accordingly, a provider, utilizing a provider computing device 150, may submit on or more service images to the electronic service image marketplace 100 via the marketplace server 112. The submitted service images may then be included in an electronic catalog 116. The process by which a provider, utilizing a provider computing device 150, submits a service image to the electronic service image marketplace 100 will be described in more detail with respect to FIGS. 2 and 3, below.

The electronic catalog 116 includes information on service images available from a plurality of providers and on service images made available by the operator of the electronic service image marketplace 100. Accordingly, the marketplace server 112 may obtain service image information for service images offered by a plurality of providers and the marketplace and make the service images available to a customer from a single network resource, such as a Web site. A customer may then acquire the service image from the service image marketplace and launch the service image in a hosted computing environment (e.g., the marketplace hosted computing environment 120 or a provider hosted computing environment 152) in a single interaction or order placed with the service image marketplace. This eliminates the need for the customer to develop his or her own service image; or research, search or otherwise investigate multiple different providers or other sources for the service image. The electronic catalog may be a catalog containing information regarding both items (such as goods and services) and service images, or may be separate catalogs, with one catalog containing information regarding items and the other catalog containing information regarding services images, without departing from the scope of the present disclosure.

Illustratively, marketplace server 112 may generate one or more user interfaces through which a customer, utilizing a customer computing device 140, may browse service images, submit queries for matching service images and view information and details regarding specific service images. An illustrative process by which a customer computing device 140 may query the electronic service image marketplace 100, and by which the marketplace server 112 generates a user interface, will be described in more detail with respect to FIGS. 4-5B, below.

After the customer selects a desired service image from the electronic service image marketplace 100, the marketplace server 112 may facilitate the configuration and acquisition of the service image and cause the launching of the service image on a hosted computing environment. In this regard, the marketplace server 112 may receive payment information from the customer computing device 140, as well as information specifying how the service image should be implemented by a hosted computing environment. In some embodiments, the customer may select a specific hosted computing environment to host the selected service image. The specific hosted computing environment may correspond, for example, to the marketplace hosted computing environment 120 associated with the electronic service image marketplace 100, or to a provider hosted computing environment 152 which is associated with the provider of the service image.

Once the service image is launched and running on a hosted computing environment, the electronic service image marketplace 100 can monitor the usage of functionality or services provided by service image and bill the customer/pay the provider accordingly via the usage monitoring server 114 and the billing server 118, respectively. Moreover, the service image marketplace may provide the customer with tools to manage, monitor, modify, etc. the service image. In the illustrated example, the usage monitoring server 114 is in communication with the marketplace hosted computing environment 120, and is operable to track a usage of the functionality (e.g., Web service) provided by the executed service image. This may be required, for example, where pricing of the service image is dependent on usage of the Web services produced by the service image when executed.

The billing server 118, on the other hand, may be provided to process payments from customers and, in some embodiments, provide payment to the providers of acquired service images. The billing server 118 may receive and provide payment information via interaction with the marketplace server 112. In some embodiments, the billing server 118 may alternatively receive and provide payment information via other processes, such as via an additional server, via telephonic interaction, or other mechanisms.

Figure 2:
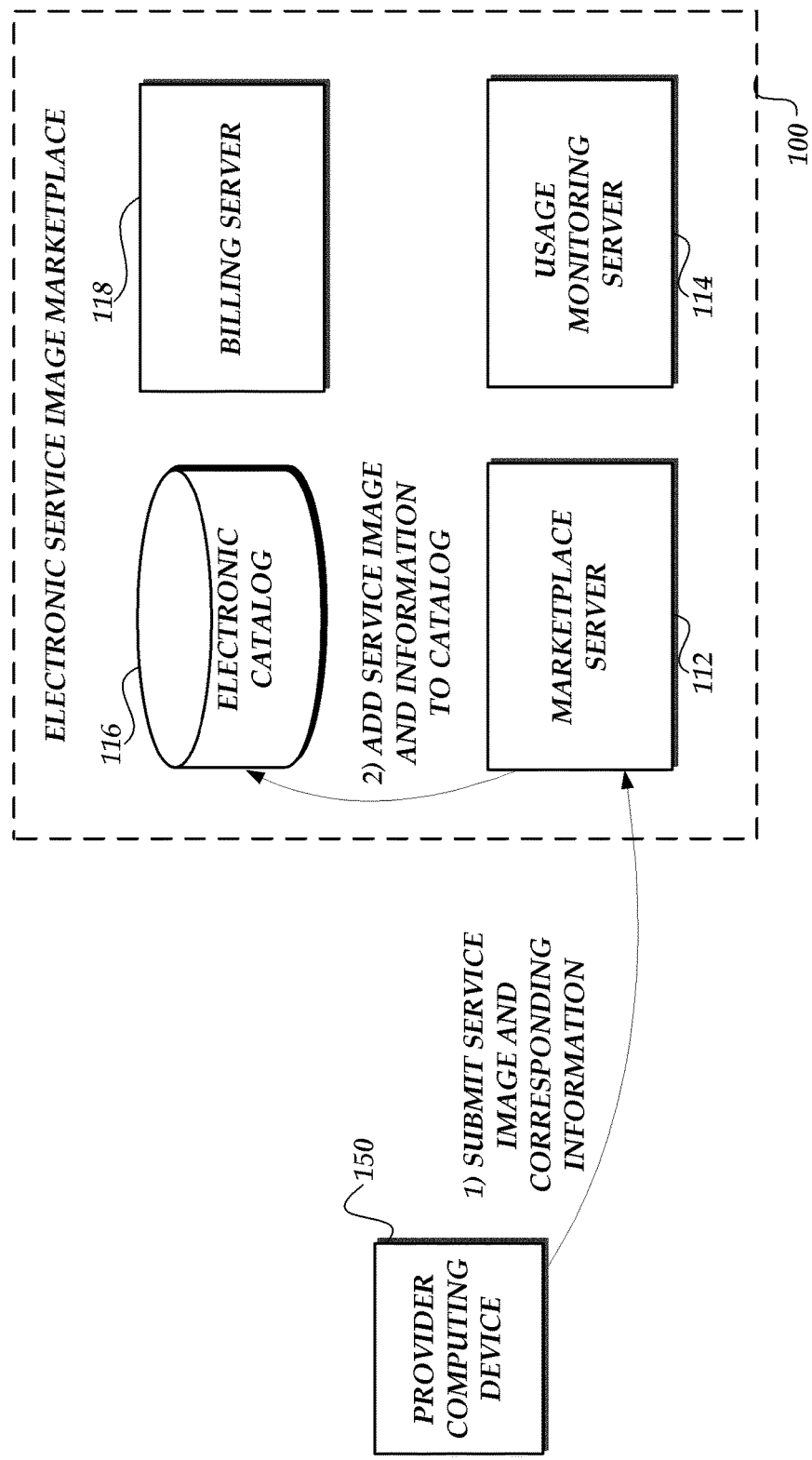
FIG. 2 is a block diagram depicting a provider computing device submitting a service image for inclusion in the service image marketplace shown in FIG. 1.

With reference to FIG. 2, an illustrative interaction for allowing a provider computing device 150 to submit a service image to the electronic service image marketplace 100 will be described. As depicted in FIG. 2, the provider computing device 150 submits a service image and information corresponding to that service image to the electronic service image marketplace 100 where the submission is processed by the marketplace server 112. The provider, utilizing the provider computing device 150, may submit information such as the name of a service image, the entity which generated the service image, software contained within the service image, or a description of the service image or software contained therein. The entity or provider may submit pricing information corresponding to the service image or use of the service image. Such pricing information may, by way of example, correspond to a one-time price for acquisition of the service image, to a monthly subscription fee associated with the service image, or to a usage fee associated with a time period of use of the service image. For example, the submitted pricing information may reflect a monthly subscription fee for acquisition of the service image in addition to an hourly usage fee for use of the service image. A provider computing device 150 may optionally submit usage restrictions associated with a provided service image, such as required acceptance of an end user license agreement ("EULA"), maximum usage restrictions, or type of usage restrictions, such as limitations allowing only non-commercial use.

Subsequent to submission of the service image and any corresponding information received from the provider computing device 150, the marketplace server 112 may interact with the electronic catalog 116 in order to store the service image and the corresponding information. The electronic catalog 116 may be implemented as a comprehensive catalog of service images that are available to a customer via the electronic service image marketplace 100. Though depicted here as a single service image catalog, the marketplace server 112 may interact with a number of distinct service image catalogs in order to store submitted service images and corresponding information. In one embodiment, the electronic catalog 116 is a conventional database stored in one or more memory storage devices. In other embodiments the electronic catalog 116 is associated with a catalog server (not shown) that is responsible for maintaining the comprehensive catalog stored therein. The electronic catalog 116 and/or associated catalog server may be in communication with other servers and databases also storing catalog information for service images available via the electronic service image marketplace 100. For example, such servers and databases may be operated by different providers and thus, may include various catalog information for service images offered by those providers.

In some embodiments, submission of a service image may not necessarily result in inclusion of the service image in the electronic catalog 116. For example, the electronic service image marketplace 100 may have automated or manual oversight routines for reviewing a service image before inclusion into the electronic catalog 116. Such a review of a service image may result in further communication between the electronic service image marketplace 100 and the provider (not shown) prior to adding the service image to the electronic catalog 116, or may result in not including the service image in the electronic catalog 116.

Though described above with reference to a service image, in some embodiments, the provider may, instead of providing a service image, provide one or more service image components. Such a service image component may correspond to, for example, an application that may be contained within a service image. In these embodiments, service image components may be stored within the electronic catalog 116, and selectable by customers of the electronic service image marketplace 100 for purchase. The electronic service image marketplace 100 may be configured to create a service image in response to a selection to one or more service image components by a customer.

Figure 3:
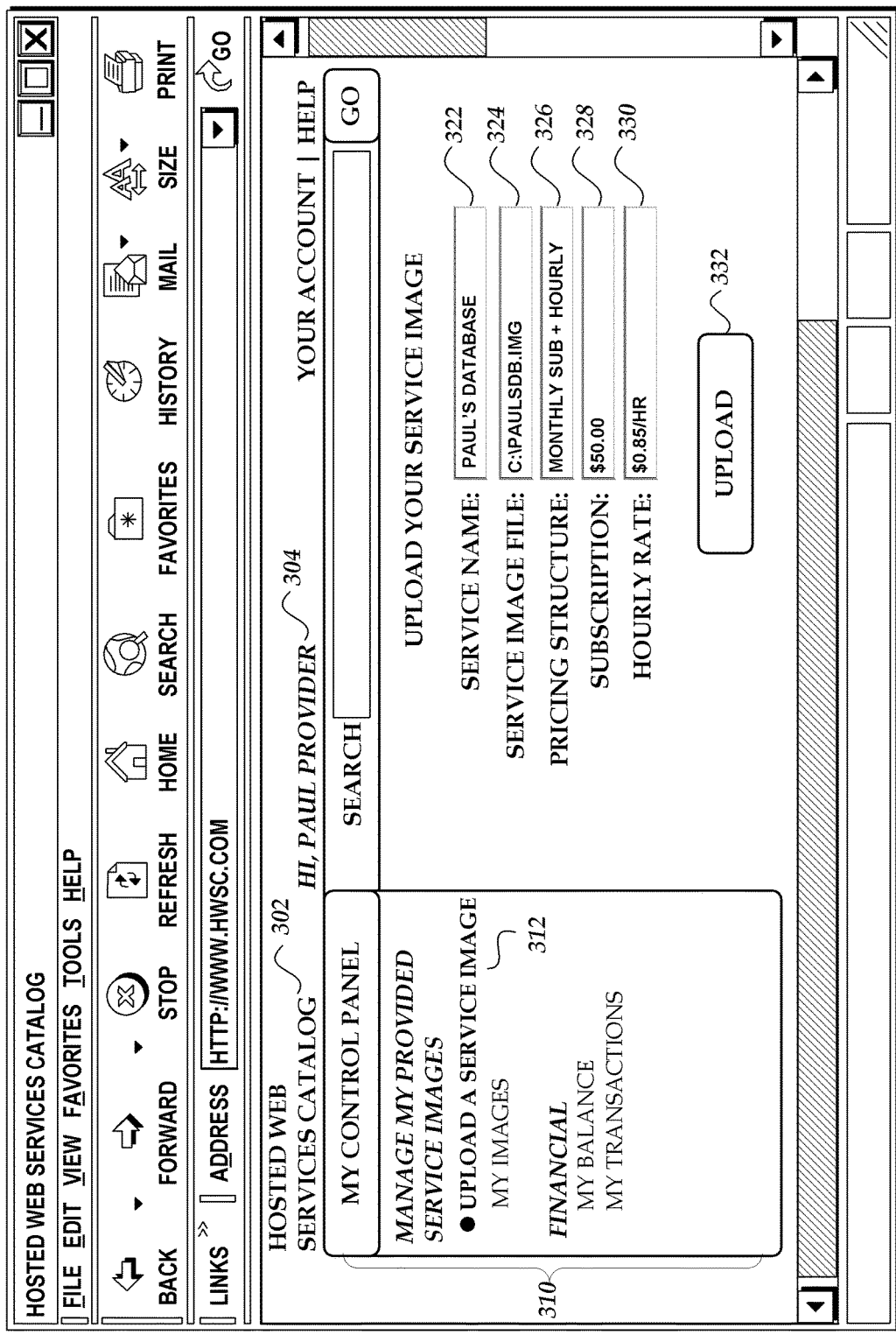
FIG. 3 depicts an illustrative user interface displayed on a provider computing device that enables a provider to submit a service image for inclusion in the service image marketplace shown in FIG. 1.

With reference to FIG. 3, one example of a user interface 300 for provider submission of service images is displayed. As shown in FIG. 3, the user interface 300 enables a provider utilizing a provider computing device, such as provider computing device 150 of FIG. 1, to submit a service image to the electronic service image marketplace 100. Illustratively, the user interface 300 may be generated by the marketplace server 112 of the electronic service image marketplace 100 and presented on the provider computing device 150 by an application, such as a browser application, on the provider computing device 150. In this example, the user interface 300 contains a title reference 302 to the electronic service image marketplace 100, i.e., the "Hosted Web Services Catalog," as well as a salutation 304 to the provider currently visiting the electronic service image marketplace 100. In the illustrated example, the provider is identified as "Paul Provider." The user interface 300 further contains a navigation panel 310, which directs the provider to various other features offered by the electronic service image marketplace 100. Illustratively, units of text within the navigation panel 310 may correspond to interactive links, which modify or change the user interface when selected. In the current example, Paul Provider, has selected link 312, "Upload a Service Image." Based on this selection, the marketplace server 112 has returned the content for user interface 300.

Through the user interface 300 the provider may submit information associated with a service image to the electronic service image marketplace 100. The provider, utilizing a provider computing device 150 may submit, via input box 320, an identifier of the service image to be used by the electronic service image marketplace 100. This may be the name displayed to customers of the electronic service image marketplace 100 when they view, browse, or search the electronic service image marketplace 100. The provider may submit additional information, such as a file location (e.g., a file name or address), and pricing information via inputs 324-330. Input box 324 allows the provider to specify the device image that is to be submitted, and that may thereafter be hosted by a hosted computing environment on behalf of a customer. In the illustrated example, the service image location is a location on the provider computing device 150, as is displayed in FIG. 3. In other embodiments, the service image file may be located on another computing device, such as a computing device within a provider hosted computing environment 152, or a computing device within the marketplace hosted computing environment 120 associated with the electronic service image marketplace 100.

In some embodiments, the electronic service image marketplace 100 may create a service image on behalf of the provider. For example, the provider may, instead of providing a location of a service image via input box 324, specify the location of a computing device. The electronic service image marketplace 100 may then locate the specified computing device, and create a service image reflecting the current software running on and/or current configuration of the computing device. Such functionality may be helpful in situations where the provider wishes to provide a service image of the current state of a computing device which exists within the marketplace hosted computing environment 120.

In the illustrated example, input boxes 326-330 enable a provider to specify pricing information associated with the submitted service image. For example, input box 326 enables the provider to specify a pricing structure associated with a service image such as a pricing structure requiring a monthly subscription rate as well as an hourly usage fee. However, as described above, other or additional pricing structures may be used. By way of non-limiting example, a pricing structure may correspond to a one-time fee, a subscription of any duration of time (e.g., years, months, weeks, etc.) that is required regardless of usage, a usage fee charged only for the time a service image is actually used, a per-use or per-access fee such as a fee associated with every time a service image is loaded, or any other pricing structure. In some embodiments, a service image may be provided free of charge. In other embodiments, pricing information may be dependent on the use of a service image. For example, a higher price may be collected for use of a service image in a commercial environment than would be collected for use of the same service image in a non-commercial or educational environment. As another example, pricing information may specify tiered pricing, such that heavy users of a service image may be charged a lower per-use fee. In still more embodiments, a provider may negotiate individual pricing information to be used for specific customers of a service image or service images. For example, individual contracts may exist or be created between a provider and each customer. One skilled in the art will appreciate that various implementations may accommodate such individualized contracts. For example, the provider may modify pricing information on a per customer basis (such as allowing a specified customer to access unlimited instances without fee).

A provider may further specify parameters for a pricing structure via input boxes 328 and 330, such as the amount of the monthly subscription rate and the hourly usage fee. In some embodiments, input boxes 328 and 330 may only appear when the input of input box 326 indicates they are required. Where input box 326 indicates that different or additional pricing information is required, alternate input boxes may appear. In some embodiments, one or more of the above inputs may not be required. In other embodiments, additional input information may be provided. For example, a provider may specify a graphic which should be associated with the provided service image. After all necessary information has been input, submission may be completed by selecting the input control 332. Accordingly, the provider may activate the input control 332 to cause the provider computing device 150 to transmit the service image and corresponding information to the marketplace server 112. As discussed above, the marketplace server 112 may then submit the received information to the electronic catalog 116.

Figure 4:
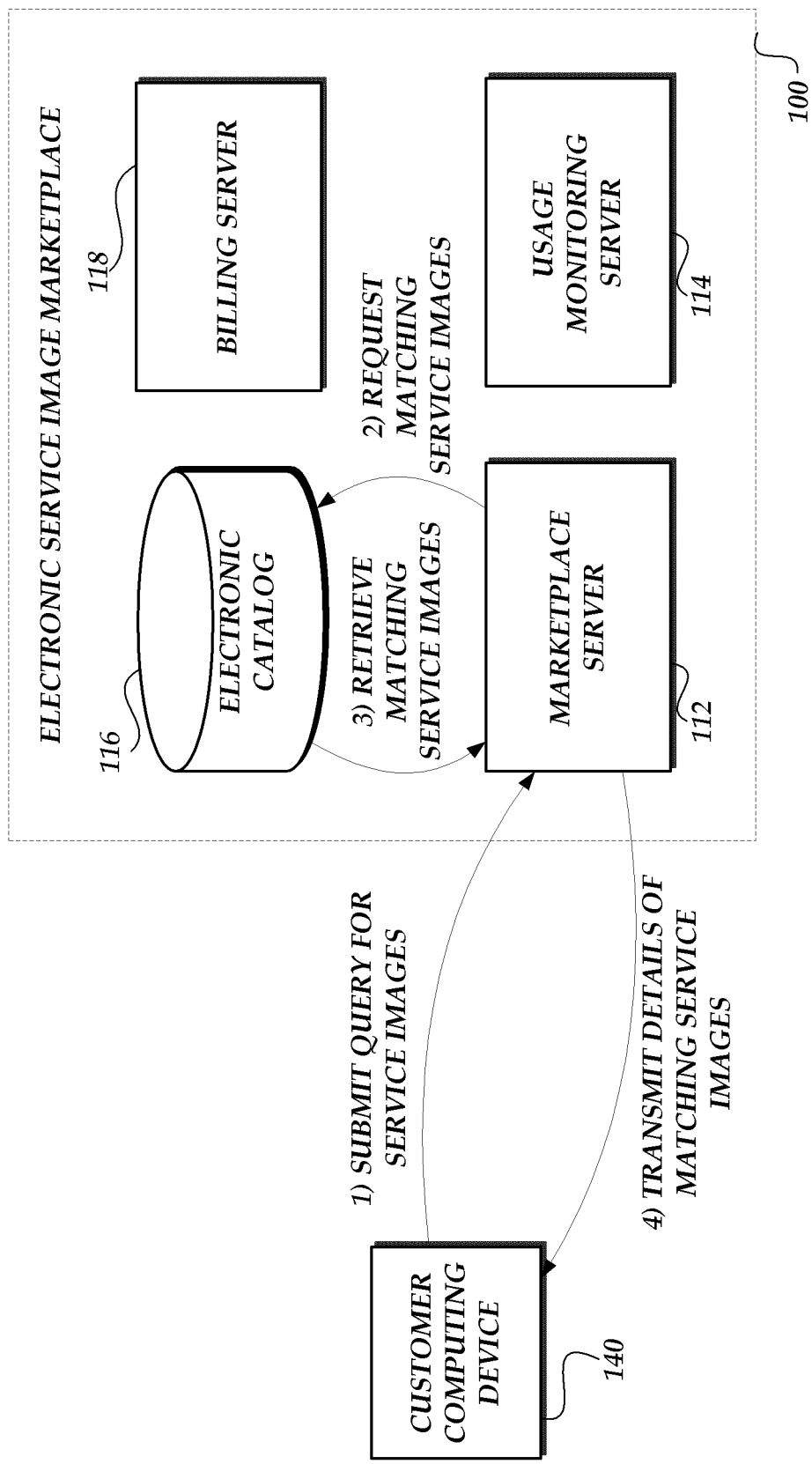
FIG. 4 is a block diagram depicting a customer computing device querying the service image marketplace shown in FIG. 1 for service images of interest.

With reference to FIG. 4, FIG. 4 is a block diagram depicting a customer computing device 140 querying the service image marketplace shown in FIG. 1 for service images of interest. As depicted in FIG. 4, the customer computing device 140, on behalf of a customer, submits a query for service images to the electronic service image marketplace 100 that is processed by the marketplace server 112. Illustratively, such a query could be submitted via a user interface, such as via an application on the customer computing device 140 which interacts with the marketplace server 112. The search query may correspond to any aspect of a desired service image, such as the functionality of the service image, the name of the service image, the name of the service image provider, pricing details of the service image, platforms on which the service image may be executed, or any other information that could be related to a service image. Submission and handling of search queries is well known in the art, and therefore will not be discussed in more detail herein.

With continued reference to FIG. 4, after submission of a search query by the customer computing device 140, the marketplace server 112 submits a request to the electronic catalog 116 for service images matching the customer submitted query. In response, the electronic catalog 116 retrieves and returns information corresponding to service images which match the customer submitted query. Details of these matching service images are then transmitted to the customer computing device 140. A customer computing device 140 may select any returned service image to view more details about the selected service image.

Figure 5A:
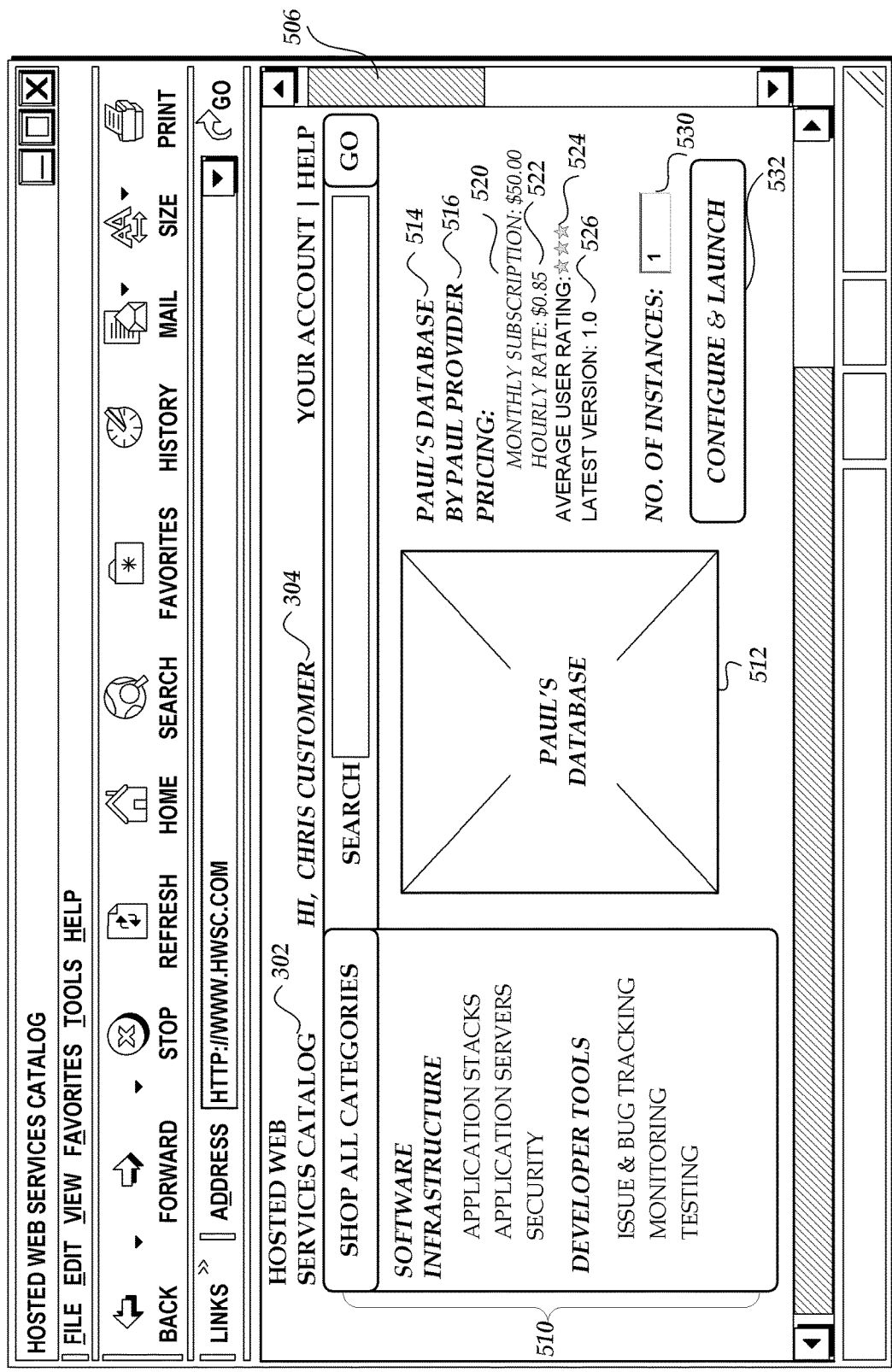
FIGS. 5A, 5B, and 5C depict illustrative user interfaces displayed on a customer computing device that present information associated with a service image available via the service image marketplace shown in FIG. 1.
Figure 5B:
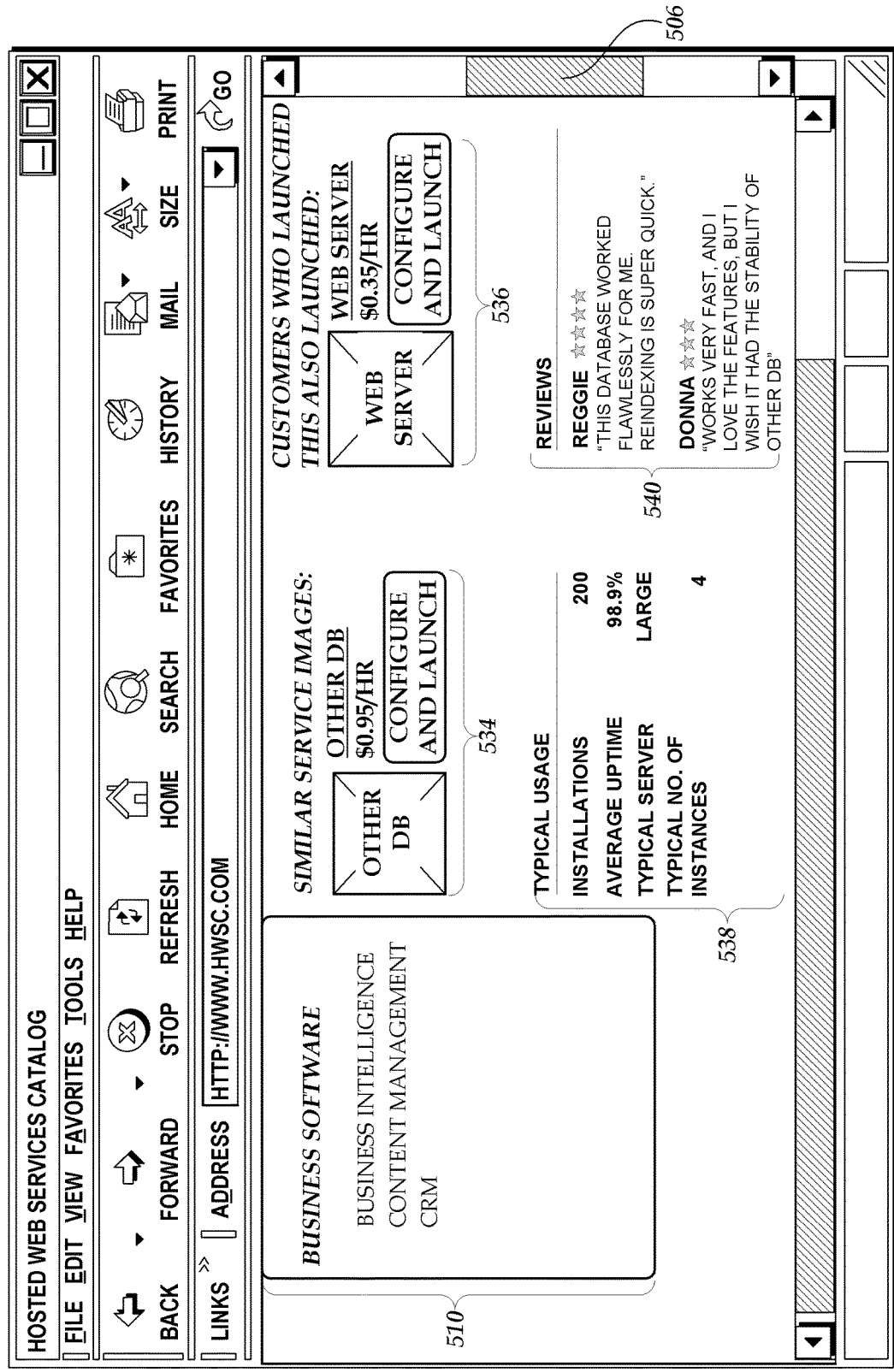

FIGS. 5A and 5B depict an illustrative user interface 500 displayed on a customer computing device that presents information associated with a service image available via the electronic service image marketplace 100. In one embodiment, user interface 500 is generated by marketplace server 112 as a result of navigation by the customer or as a result of selection of a search result returned by the marketplace server 112. While depicted in two figures, one skilled in the art will appreciate that the user interface 500 may be a single user interface and that the customer may view different portions of the interface by use of an interface input, such as scroll bar 506. As shown in FIG. 5A, the user interface 300 provides information retrieved from the electronic service image marketplace 100, i.e., the Hosted Web Service Catalog" 302 to "Chris Customer" 304, an illustrative customer accessing the "Hosted Web Services Catalog." Because the customer is viewing details regarding a specific offered service image, and may wish to browse to other service images, navigation pane 510 is displayed. Navigation pane 510 contains links that enable a customer to browse and select other service images available via the service images marketplace 100. Currently, the user interface 500 depicts information for the service image "Paul's Database," which corresponds to the service image uploaded by user Paul Provider, discussed previously with reference to FIG. 3. Display features 512-526 display information corresponding to the service image. Display feature 512, for example, is a graphic associated with the service image. The graphic may correspond to a logo associated with the service image or with the service image provider. Display features 514 and 516 depict the name of the service image and the provider of the service image, respectively. Display features 520-522 depict pricing information associated with the service image, as discussed previously with respect to FIG. 3. Display feature 524 depicts reviews given to the service image by users of the "Hosted Web Services Catalog." As depicted, display feature 524 reflects that "Paul's Database" has been given, on average, a three star rating by users of the "Hosted Web Services Catalog." As will be appreciated by those skilled in the art, various other methods of displaying a rating of a service image may be employed. Display feature 526 depicts a version number of the service image; in the current example, version 1.0. In some embodiments, display feature 526 may be selectable to view alternative versions of the selected service image that are available. This may be desirable, for example, where previous versions have different desired characteristics, such as different pricings, features, compatibility, or ratings. Input box 530 may be utilized by the customer to specify a number of instances of the selected service image that the customer desires. Generally speaking, an instance refers to an individual computing device—virtual or physical—which has executed, loaded, or launched the selected service image. A customer may wish to specify multiple instances, for example, where the customer wishes to distribute processing or load access across multiple instances. In other examples, multiple instances may be functional to interact, or to provide different functionality via the same service image. The number of instances in input box 530 may optionally be associated with a default value, such that the customer is not required to select a number of instances. After inputting the desired number of instances (if necessary), the customer may activate input button 532 to further configure and launch the viewed service image. One example of a user interface used to further configure and launch a service image will be discussed with respect to FIG. 6, below.

With reference to FIG. 5B, an additional portion of user interface 500 regarding the "Paul's Database" service image is displayed. As discussed above, the customer may view this additional portion of the user interface by interacting with the user interface 500, such as by moving the scroll bar 506. FIG. 5B depicts additional information regarding the "Paul's Database" service image via display features 534-540. Display feature 534 depicts information regarding other service images which are similar in some fashion to "Paul's Database." In the current example, "Other DB" is an alternative service image available via the electronic service image marketplace 100 which competes with and offers similar functionality to "Paul's Database." Such service images may be identified, for example, by analyzing which database customers ultimately purchase after viewing a service image, or by categorizing service images and displaying images within the same category. Various other mechanisms by which similar service images may be identified are well known in the art. Similar to display feature 534, display feature 536 displays service images which are commonly purchased in conjunction with "Paul's Database." In this example, customers who launched at least one instance of "Paul's Database" have frequently also launched an instance of the "Web Server" service image. Both display features 534 and 536 have additional information regarding their relevant service images, such as graphical and pricing information. Input buttons may be provided along with display features 534 and 536 to allow a customer to select the relevant service image for configuration and launch.

Illustrative display features 538 and 540 depict still more information regarding the "Paul's Database" service image. Display feature 538 depicts statistical information related to current or previously launched instances of "Paul's Database," including the number of installations of the service image which have occurred, the average uptime of the installed service images (which may correspond with a reliability of the service image), the typical type of computing device on which the service image is launched, and the typical number of instances of the service image which are launched by a customer. Display feature 540 depicts individual reviews generated by users of the service image marketplace regarding "Paul's Database." Each review may have information such as a rating of the service image on a given scale, and an authored comment portion regarding the service image. In some embodiments, additional or alternative display features may be depicted regarding a service image.

Figure 5C:
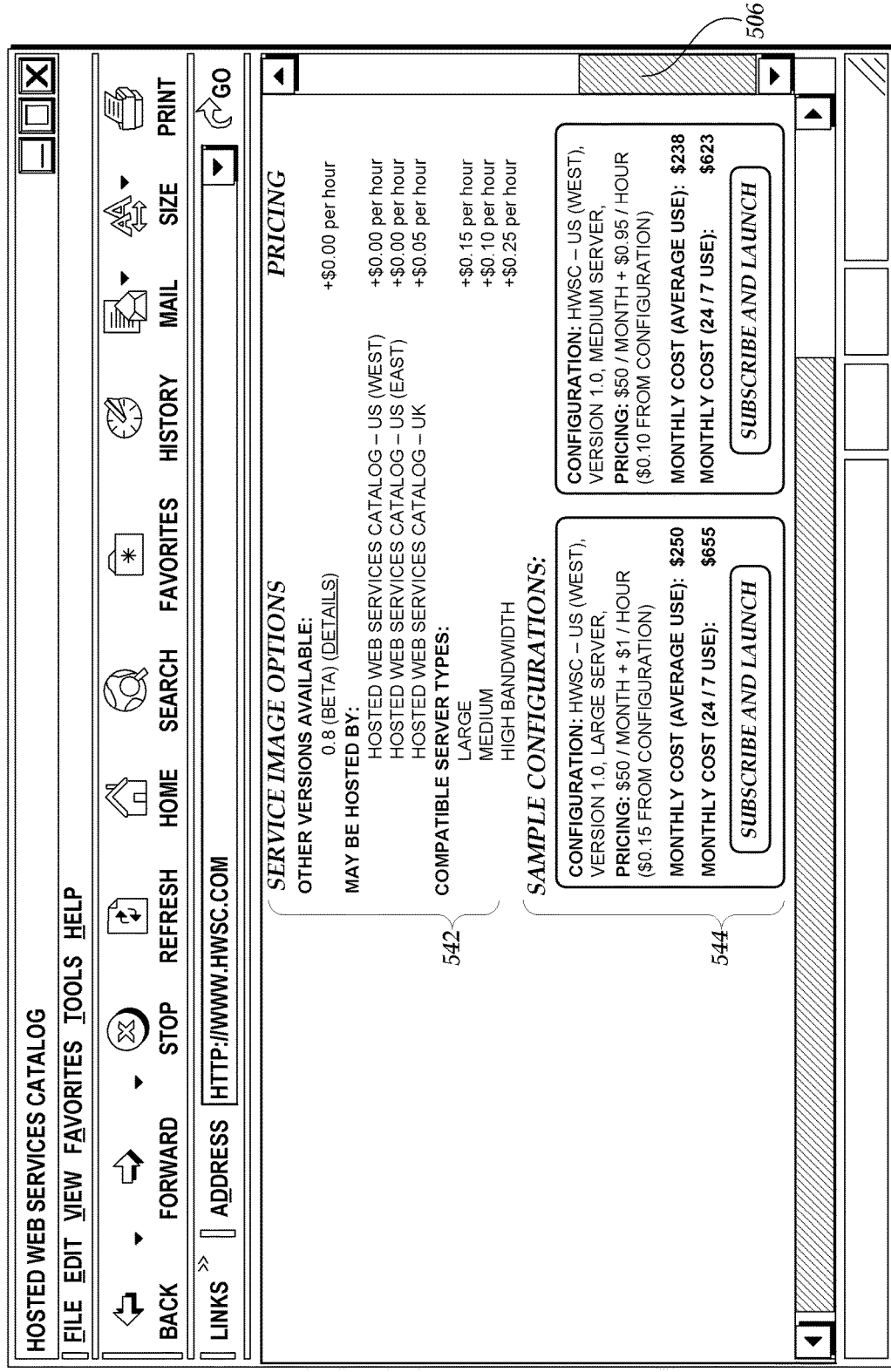

With reference to FIG. 5C, an additional portion of user interface 500 regarding the "Paul's Database" service image is displayed. As discussed above, the customer may view this additional portion of the user interface by interacting with user interface 500, such as by moving the scroll bar 506.

FIG. 5C depicts additional information regarding the "Paul's Database" service image by way of display features 542 and 544. Display feature 544 depicts information regarding options available to customers for executing the displayed service image. In the current example, display feature 544 reflects other versions of "Paul's Database" available, the locations of hosted computing environments which may execute "Paul's Database," and types of computing devices available to execute "Paul's Database." As shown by display feature 544, each configuration option is associated with a modification of the pricing of the service image. Display feature 544 reflects sample configurations for the execution of the service image provided by the electronic service image marketplace 100. As shown by display feature 544, two configurations (reflecting the various options shown by display feature 542) are shown, each resulting in a different estimated cost to the customer. Illustratively, the cost associated with average use may be determined based on the usage of the service image by other customers, while the "24/7" cost may be determined by calculating the cost to execute the service image continuously for a month. In this illustrative example, the configurations reflect a single instance of a service image. However, some configurations may reflect multiple instances, or allow a customer to specify multiple instances of a configuration for launch. Additionally, the configuration options displayed may be customized based on customer information of the present customer. For example, if Chris Customer is accessing the electronic service image marketplace 100 from the western United States, the "Hosted Web Services Catalog—US (West)" option may be pre-selected for display feature 544. Conversely, if Chris accesses the electronic service image marketplace 100 from the United Kingdom, the option for hosting on "Hosted Web Service Catalog—UK" may be pre-selected.

Though described above with reference to a service image, in some embodiments, the user interface 500 may describe details regarding service image components. These components may correspond to applications which can be included within a customized service image. In these embodiments, the electronic service image marketplace 100 may be configured to receive, from a customer, a selection of one or more service image components, and create a service image containing the selected components for execution on a selected hosted computing environment.

Figure 6:
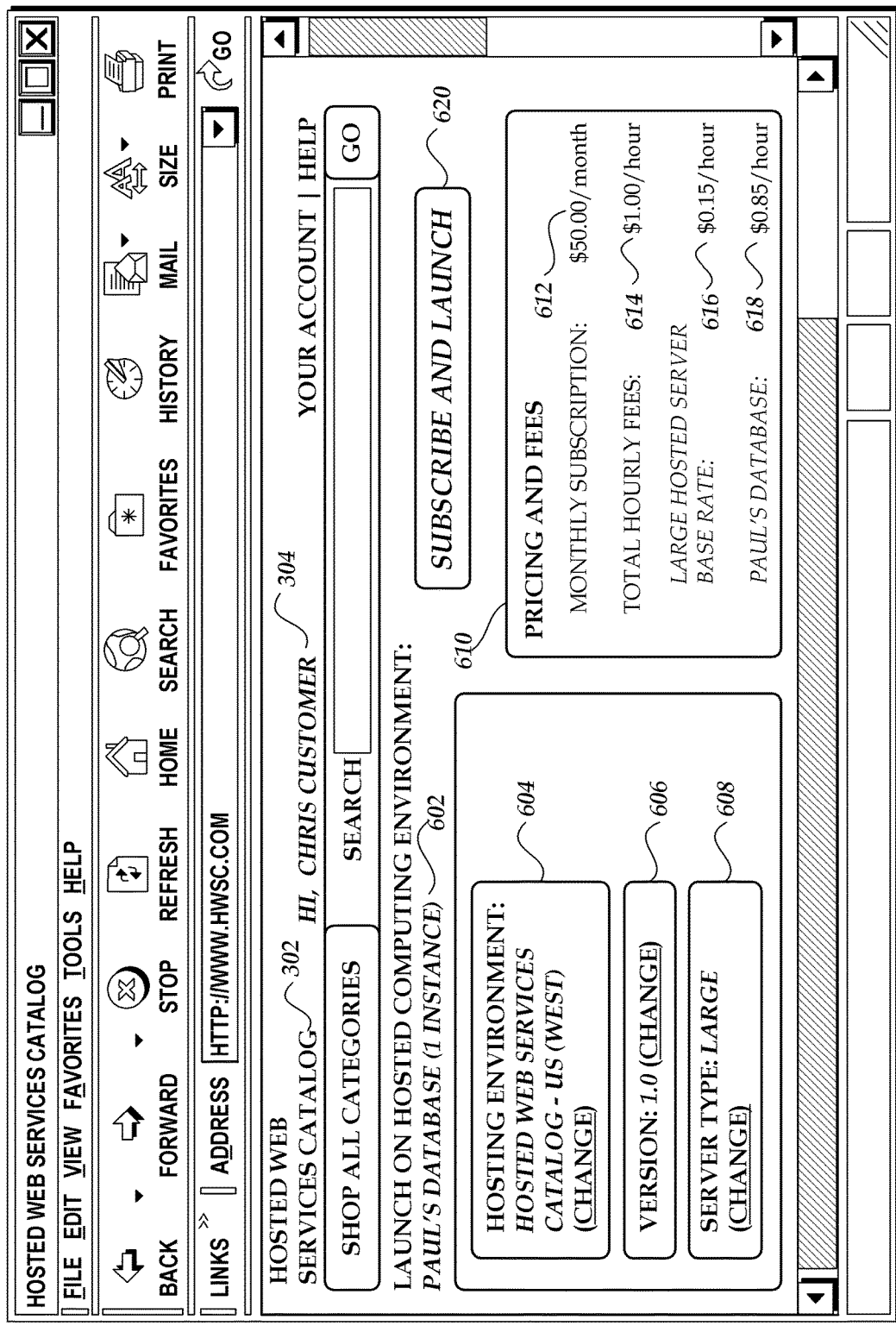
FIG. 6 depicts an illustrative user interface displayed on a customer computing device that enables a customer to configure a service image being acquired from the service image marketplace shown in FIG. 1.

With reference to FIG. 6, an illustrative user interface 600 displayed on a customer computing device that enables a customer to configure a service image being acquired from the electronic service image marketplace 100 is depicted. The user interface 600 may enable a customer to configure, subscribe to, and launch a service image. The depicted user interface 600 may be displayed, for example, by selecting the input button 532 of FIG. 5A, discussed above. As discussed above, the user interface 600 gives access to the electronic service image marketplace 100 known as the "Hosted Web Services Catalog" 302. The current user is Chris Customer 304. Display feature 602 reflects the requested service image, as well as the number of instances desired. As shown in FIG. 6, display feature 602 reflects that Chris Customer has requested that one instance of the service image "Paul's Database" be launched. Input boxes 604-608 depict various inputs through which a customer may configure the service image that is to be launched. Input box 604, for example, reflects that the customer may select a hosted computing environment on which the service image is to be launched and hosted. A hosted computing environment can correspond to a marketplace hosted computing environment 120 associated with the electronic service image marketplace 100, with a hosted computing environment provided by the provider of the service image, such as provider hosted computing environment 152, or with another hosted computing environment accessible to the electronic service image marketplace 100. In the current user interface, input box 604 reflects that Chris Customer has selected that "Paul's Database" be launched on the hosted computing environment associated with the "Hosted Web Services Catalog" and located in the western United States. For the purposes of this example, this hosted computing environment corresponds to marketplace hosted computing environment 120 associated with the electronic service image marketplace 100.

Input box 606 enables the customer to select a version of the service image that is to be launched. Multiple versions of the same service image may be provided for various reasons, such as cost, reliability, or interoperability. In some embodiments, only a single version of a service image may be available. In such embodiments, the customer may not be able to alter input box 606, or input box 606 may not be displayed. Input box 608 enables the customer to configure and select the type of instance on which the service image is to be launched. In the current example, the selected hosting environment, "Hosted Web Services Catalog—US (WEST)," allows both large and small instances to be launched. For the purposes of example, a large instance may correspond to a computing device or virtual machine with more processing power, more random access memory, or more data storage. A small instance may, conversely, have a smaller amount of processing power, memory, or storage. As such, a small instance may correspond to a lower hourly usage fee than the large instance. As will be appreciated by one skilled in the art, a variety of types of instances may be presented to the user. In some embodiments, only a single instance type may be available, and the user may not be presented with a selection. In still more embodiments, instance types may vary based on the selected hosted computing environment, and as such, the input box 608 may be substituted for alternative input boxes reflecting the instance types available on a selected hosted computing environment.

With continued reference to FIG. 6, display feature 610 reflects pricing information associated with the currently selected configuration. In the current example, a single instance of the service image "Paul's Database" is associated with a monthly subscription fee of fifty dollars (as discussed with respect to FIG. 3, above). This fifty dollar monthly subscription rate is reflected by display feature 612. Illustratively, a monthly subscription rate may be assessed for each month that instances exist, regardless of usage of that instance. In addition, a single instance of the service image "Paul's Database" is further associated with an hourly usage cost of eighty five cents per hour. This hourly usage cost is reflected by display feature 618. In addition to pricing information associated with the service image, the electronic service image marketplace 100 may also assess fees related to the instance type a customer has selected. As discussed above, Chris Customer has selected a large instance on which to load the service image. In the current example, a large instance is associated with a fee rate of fifteen cents per hour of use, and no subscription fee. This hourly rate is reflected in display feature 616. The total hourly rate associated with the customer selected configuration is then depicted in display feature 614. In the current example, one instance of "Paul's Database" running on a large instance of the hosting environment "Hosted Web Services Catalog—US (West)" is one dollar per hour. As discussed above, various pricing information may be associated with various service images, and as such, additional or alternate display features may be depicted in order to reflect the pricing information of each service image and configuration. After configuring the parameters for launching an instance of the service image via input boxes 604-608, the customer may activate input button 620 to subscribe to and launch the selected instance. The process by which a service image is subscribed to and launched is discussed in more detail below.

Figure 7A:
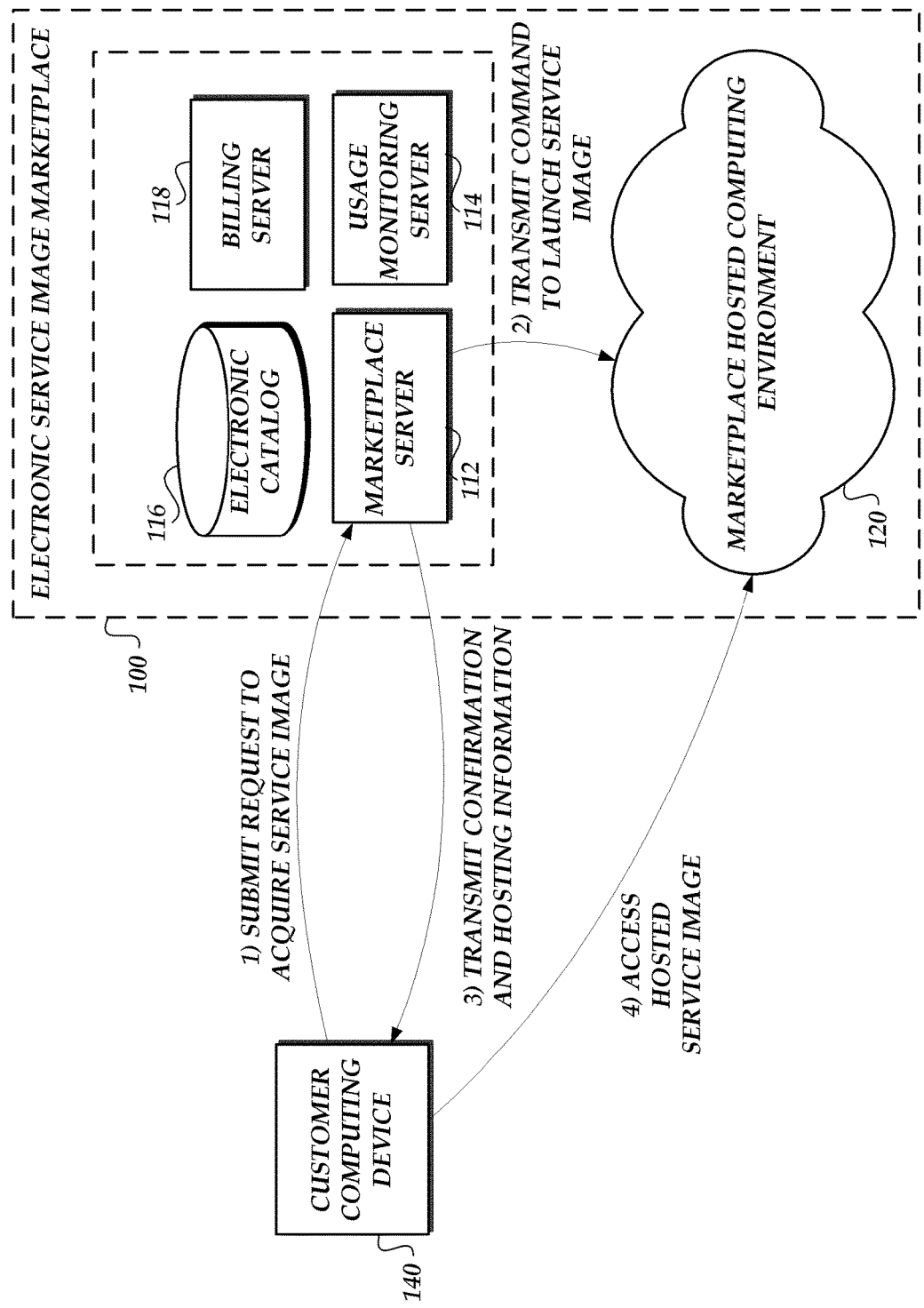
FIGS. 7A and 7B are block diagrams depicting the acquisition of a service image by the customer and launching of the acquired service image on a hosted computing environment associated with the service image marketplace shown in FIG. 1.
Figure 7B:
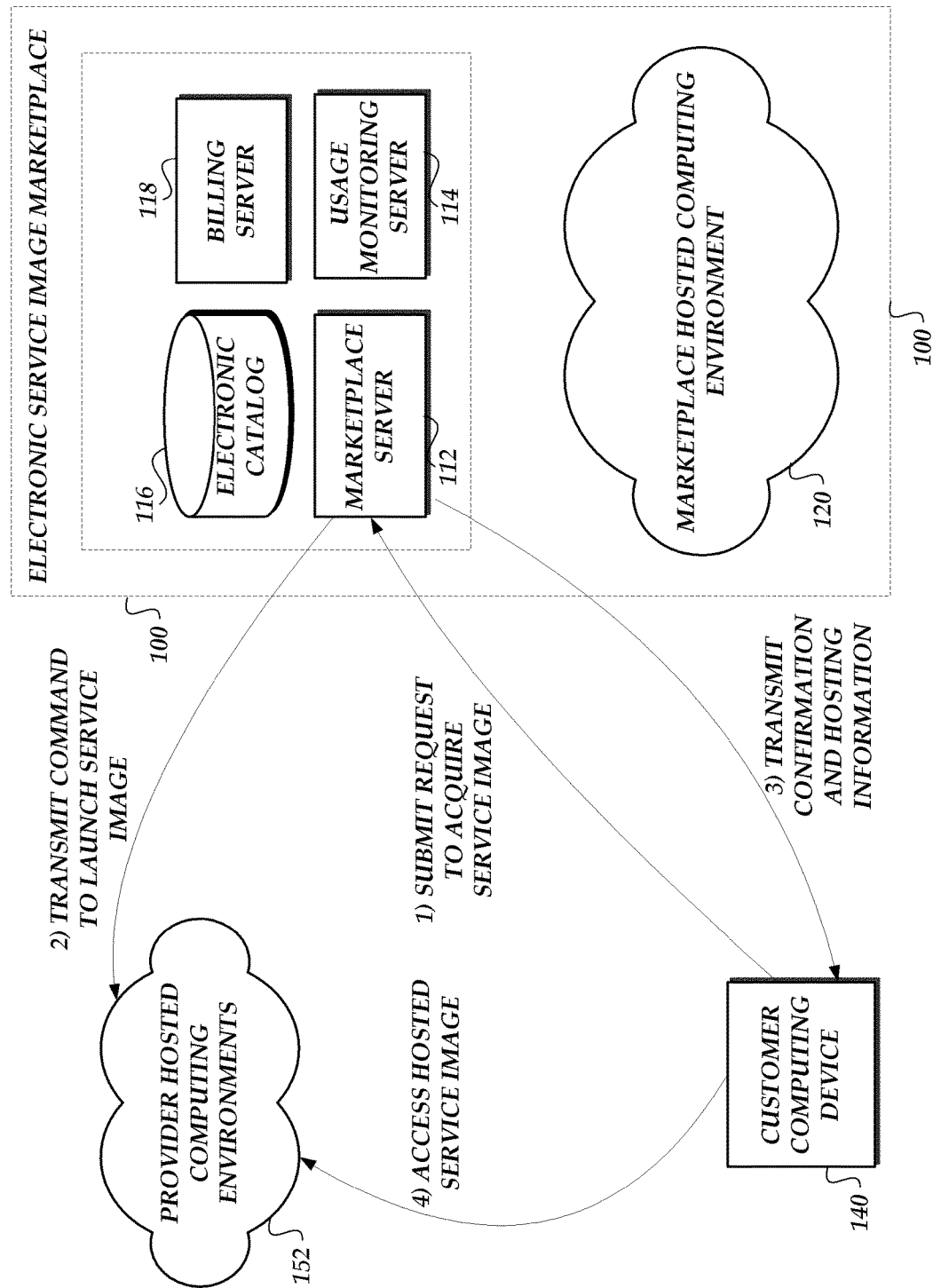

With respect to FIGS. 7A and 7B, illustrative interactions for acquiring and launching a service image will be described. With respect to FIG. 7A, an illustrative interaction is shown for acquiring and launching a service image on a hosted computing environment 112 associated with a electronic service image marketplace 100 is depicted. With respect to FIG. 7B, an illustrative interaction to acquire and launch the same service image is depicted, however, the service image is to be launched on a provider hosted computing environment 152. As the illustrative interactions depict the acquisition and launch the same service image via the same service image retail environment 110, reference will be made generally to both figures, with specific references to each as required when the depicted interactions differ.

FIGS. 7A and 7B are block diagrams depicting the acquisition of a service image by the customer and launching of the acquired service image on a hosted computing environment associated with the electronic service image marketplace 100. In this regard, a customer, utilizing a customer computing device 140, may request to acquire a service image the customer has found and selected from the electronic service image marketplace 100. The request may be created, for example, by selecting input button 620 of FIG. 6, described above and processed by the Web service 112 of the service image retail environment 110. After receiving the request to acquire access to the service image, the marketplace server 112 may transmit a command which causes the launch of the service image on a hosted computing environment. For the purposes of illustration, this command is depicted as transmitted from the marketplace server 112. As will be appreciated by one skilled in the art, one or more intermediary servers in the electronic service image marketplace 100 may be required in order to transmit the command to launch the service image. Further, in some embodiments, the marketplace server 112 may interact with the electronic catalog 116 to acquire the selected service image before transmitted the command to launch. In these embodiments, the marketplace server 112 may further transmit the selected service image to the selected hosted computing environment.

With respect to FIG. 7A, the selected hosted computing environment is the marketplace hosted computing environment 120. With respect to FIG. 7B, the selected hosted computing environment is a provider computing environment 152, which has been made available for hosting the service image by the provider of the service image. As will be appreciated by one skilled in the art, the command transmitted may vary depending on the destination hosted computing environment. For example, where the hosted computing environment is associated with the electronic service image marketplace 100, the commands may be known to the service image retail environment 110. With respect to a provider hosted computing environment 152, a provider may be required to register the provider hosted computing environment 152 with the electronic service image marketplace 100, such as by specifying the location of the provider hosted computing environment 152 and any commands necessary to launch service images on the provider hosted computing environment 152. In some embodiments, the selected hosted computing environment may transmit a confirmation to the service image retail environment 110 that the service image has been launched. Subsequent to launching the customer selected service image, the marketplace server 112 transmits a confirmation to the customer computing device 140, as well as information regarding the hosted service image. Such information may include the location of the computing device hosting the service image and any access information required to access the computing device hosting the service image. Subsequent to receiving confirmation of launch and relevant hosting information, the customer computing device 140 may access the computing device hosting the service image, and therefore may access any Web services implemented by the computing device hosting the service image. With respect to FIG. 7A, the customer computing device 140 may communicate with the marketplace hosted computing environment 120 in order to access the Web services. With respect to FIG. 7B, the customer computing device 140 may communicate with the provider hosted computing environment 152.

Though not depicted in FIGS. 7A and 7B, after the launch of the selected service image, the usage monitoring server 114 may communicate with the selected hosted computing environment to monitor usage of the computing device hosting the service image. As discussed above, the customer may access the Web services implemented by the computing device hosting the service image, and may allow others to access the Web services. The usage monitoring server 114 may monitor access to the Web services by both the acquiring customer and by other users. In some embodiments, the usage monitoring server 114 may be operable to differentiate between accesses by different users. The billing server 118 may utilize information provided by the usage monitoring server 114, as well as information from the marketplace server 112 or the electronic catalog 116, to create billing information for the customer, as well as payment information for the provider generated from the customer's use. The billing server may further process payments from the customer, and provide payment to the provider of the service image.

Figure 8:
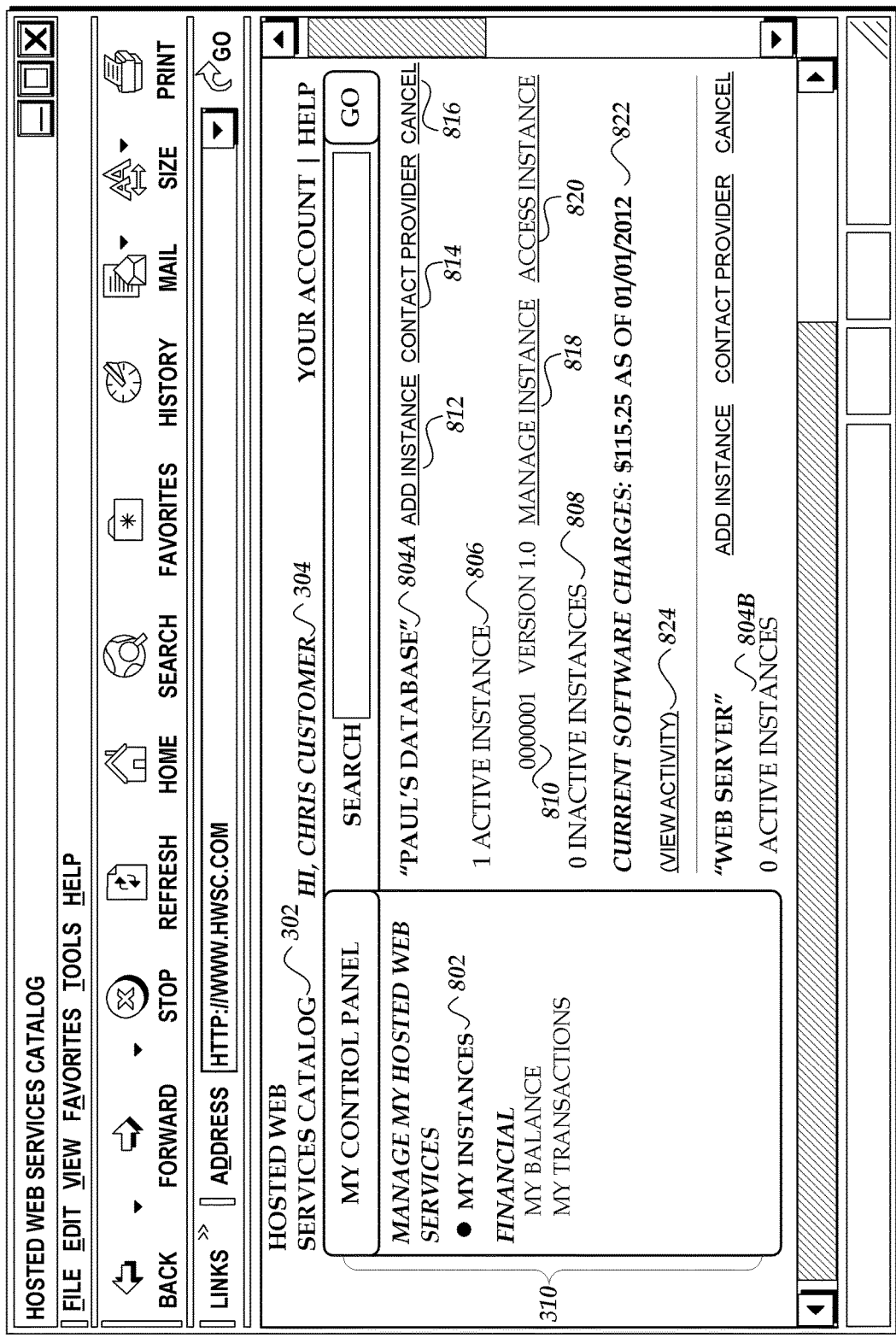
FIG. 8 depicts an illustrative user interface displayed on a customer computing device that presents details regarding one or more hosted service images acquired by the customer from the service image marketplace shown in FIG. 1.

With reference to FIG. 8, one example of a user interface 800 for providing information regarding acquired service images is displayed. As shown in FIG. 8, the user interface 800 enables a customer to receive information regarding services images acquired via the electronic service image marketplace 100, i.e., the "Hosted Web Services Catalog," 302. The current user of the "Hosted Web Services Catalog" is Chris Customer 304. A navigation panel 310 directs the customer to various other features offered by the electronic service image marketplace 100. In this illustrative example, Chris Customer has selected the "My Instances" link 802. The resultant user interface 800 gives Chris Customer access to information regarding instances of service images launched via the electronic service image marketplace 100. Display features 804A and 804B reflect the titles of service images which Chris Customer has previously acquired. In this example, Chris Customer has acquired service images titled both "Paul's Database" and "Web Server." For the purposes of illustration, only the instance reflected by display feature 804A will be discussed further. It will be appreciated by one skilled in the art that information regarding multiple additional service image titles may be displayed via the same or a similar user interface. Display features 806 and 808 reflect the current status of instances of the "Paul's Database" service image. As shown in display feature 806, one instance of the service image is currently "active," or being executed by a computing device within the selected hosted computing environment. Display feature 808 reflects that zero instances are currently inactive; having been created but not currently being executed by a computing device. In some embodiments, a hosted computing environment may be operable to load and unload instances of a service image as usage of the service image is needed. This may be desirable, for example, where an hourly fee is assessed for use of a service image. In this manner, a service may be made inactive, and the hourly fee would not be assessed during this period. Function links 812-816 enable a customer to modify the configuration of an acquired service image. Link 812 may be selected by a customer to create an additional instance of the service image to which the link 812 corresponds. In the current example, Chris Customer can select link 812 in order to create a new instance of the service image "Paul's Database." Selecting the link may lead to a user interface which allows configuring the new instance. One example of such a user interface is discussed above with respect to FIG. 6. In some embodiments, the user interface that is displayed for acquisition of a new service image may differ from the user interface displayed when creating a new instance of an already acquired service image. For example, a subscription fee may not be assessed when adding a new instance of an already acquired service image. Function link 814 enables a customer to contact the provider of the service image. Such contact may be facilitated by sending a message through the electronic service image marketplace 100 or by sending a message outside of the electronic service image marketplace 100, such as by electronic mail or posting to an external network accessible site associated with the provider. In some embodiments, the provider of a service image may specify how they wish to be contacted, and the function link 814 may implement functionality corresponding to the provider's specification. Function link 816 may be selected by a customer in order to cancel acquisition of a service image. Illustratively, this function may serve to inactivate or remove any instances of the service image. In some embodiments, this function may not be available to a customer unless all currently active instances are inactivated.

In the current example, each instance of a service image is identified by a unique instance identifier 810. These instance identifiers may be unique across all instances associated with a customer, across all instances hosted by a selected hosted computing environment, or across all instances launched via the service image marketplace. Function links 818 and 820 enable a customer to manage or access a specific instance of a service image. In the current example, function link 818 enables Chris Customer to manage instance "0000001" 810. Link 818 is selectable by Chris Customer to display management functions associated with the instance. For example, Chris Customer may activate or deactivate an instance of a service image, modify the type of computing device which is hosting the service image, or change other functions or features associated with the instance. Chris Customer can select link 820 in order to access the corresponding instance. In some embodiments, this access may be granted via an interface which allows API calls to be made to the instance. In other embodiments, a command terminal interface or graphical user interface may be provided in order to access the instance. One skilled in the art will appreciate that access to an instance of a hosted service image may be given in various additional ways. Display feature 822 depicts the current charges associated with usage of the service image. In the current example, Chris Customer has been assessed fees of $115.25 for use of the service image "Paul's Database." These charges are reflective of all instances of the associated service image. In some embodiments, charges may reflect only fees associated with a particular instance of a service image (such that each instance displays individual charges). In still more embodiments, charges may reflect fees associated with all service images acquired by a customer. Chris Customer may select function link 824 to view details associated with the current charges, such as a detailed billing report. Such a detailed report may include, for example, timing of usage associated with the charges or assessed subscription fees.

Figure 9:
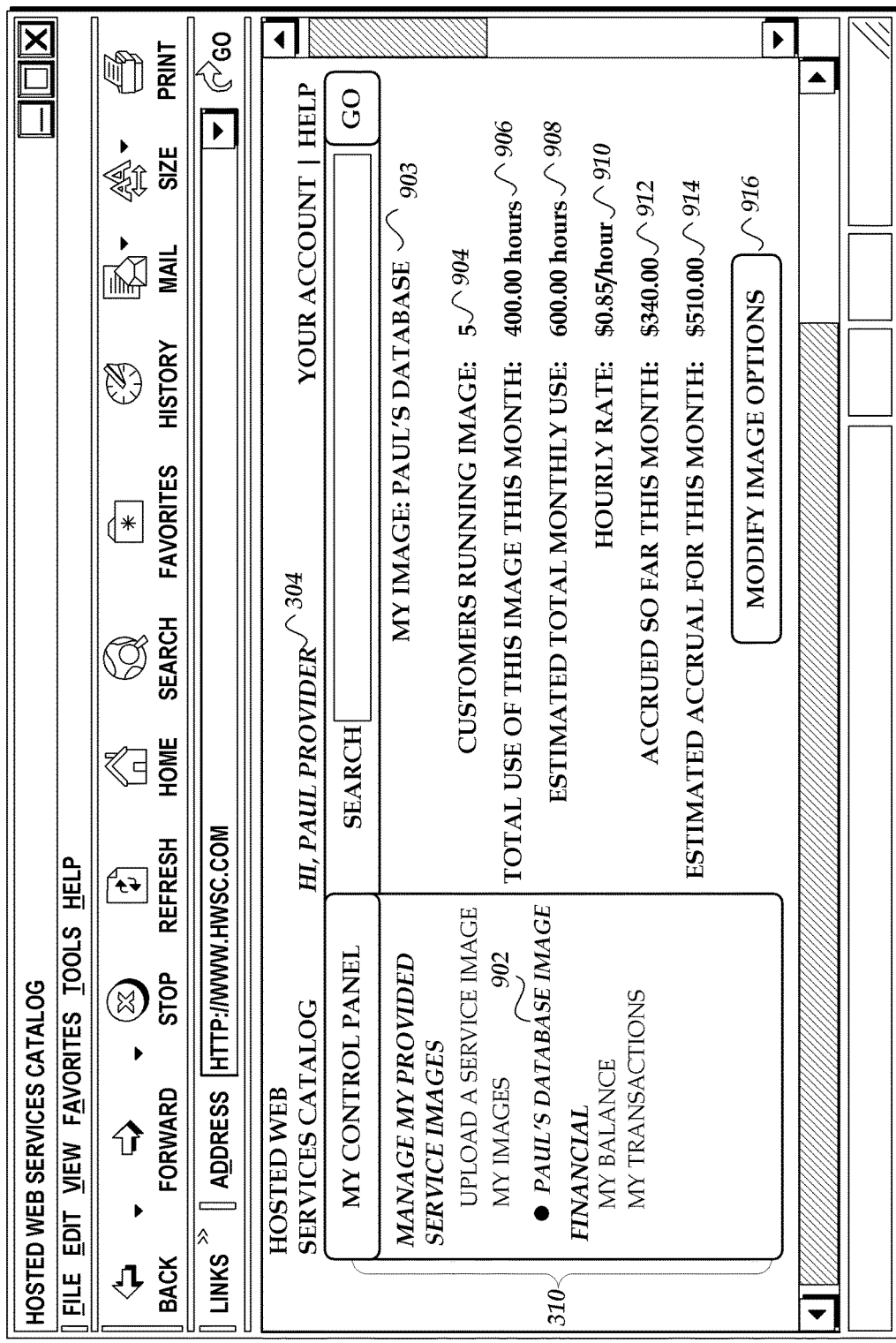
FIG. 9 depicts an illustrative user interface displayed on a provider computing device that presents details regarding one or more service images submitted by the provider to the service image marketplace shown in FIG. 1.

With reference to FIG. 9, an illustrative user interface 900 displayed on a customer computing device and detailing information regarding provided service images is depicted. As shown in FIG. 9, the user interface 900 enables a provider to receive information regarding service images provided to the electronic service image marketplace 100, i.e., the "Hosted Web Services Catalog". The current user of the "Hosted Web Services Catalog" is Paul Provider 304. As discussed above with respect to FIG. 3, Paul Provider has provided the service image "Paul's Database" to the electronic service image marketplace 100. To reflect that Paul has provided this service image, the navigation panel 310 now displays a link 902 under the heading "My Images" which is selectable by a customer to view information about the provided service image. The user interface 900 is reflective of Paul Provider's selection of link 902. Display features 903-914 depict information regarding the corresponding service image. Display feature 903 displays the title of the service image. Display feature 904 reflects the current number of customers which have acquired the instance via the electronic service image marketplace 100, while display feature 906 depicts the number of hours the service image has been used for the current month. Display feature 908 depicts an estimated number of total hours the service image will be used during the month, based on the current usage.

Display feature 910 depicts the hourly rate associated with usage of the service image, as set by the Paul Provider. Display features 912 and 914 reflect both current and estimated monthly accruals associated with usage of the service image by customers. In some embodiments, accruals due to the provider for use of a service image may be used to offset amounts owed to the electronic service image marketplace 100 by the provider. For example, Paul Provider may also be a customer of the service image marketplace, and therefore have fees or charges assessed based on usage of the electronic service image marketplace 100. Input button 916 is selectable by the provider in order to modify options associated with a service image. For example, Paul Provider may modify the hourly rate, subscription fee, or other options associated with "Paul's Database."

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:

from each of a plurality of providers and an operator of an electronic catalog configured to store service images, receiving a service image and pricing information associated with the service image, wherein the service image, when executed on a hosted computing environment comprising a plurality of host computing devices, implements one or more network accessible services associated with the service image;

storing the received service image and pricing information associated with the received service image, in an electronic catalog, wherein the electronic catalog is accessible to search for one or more service images for execution on a hosted computing environment;

providing, to a computing device associated with a customer, access to the electronic catalog;

receiving, from the computing device associated with the customer, identification of a selected service image selected from a search of the one or more service images stored in the electronic catalog;

receiving configuration information from the computing device associated with the customer;

in response to receiving the identification of the selected service image and the configuration information:

generating, on behalf of the customer, a virtual computing device instance for the selected service image, wherein the virtual computing device instance is generated on a host computing device of a hosted computing environment;

configuring the virtual computing device instance for the selected service image in accordance with the configuration information received from the computing device associated with the customer; and causing the virtual computing device instance for the selected service image that is generated on the host computing device of the hosted computing environment and configured with the configuration information, to execute the selected service image, wherein the selected service image, when executed, implements the one or more network accessible services associated with the selected service image;

providing, to the computing device associated with the customer, access to the virtual computing device instance;

monitoring usage of the one or more network accessible services associated with the selected service image to determine a usage demand for the one or more network accessible services;

determining that an additional virtual computing device instance is needed to meet the usage demand for the one or more network accessible services;

generating, on behalf of the customer, the additional virtual computing device instance, wherein the additional virtual computing device instance is generated on the host computing device of the hosted computing environment; and causing the additional virtual computing device instance generated on the host computing device of the hosted computing environment, to execute the selected service image.

2. The computer-implemented method of claim 1, wherein providing, to the computing device associated with the customer, access to the electronic catalog comprises providing information associated with each service image of the one or more service images stored in the electronic catalog, the provided information corresponding to at least one of pricing information associated with the service image, reviews of the service image, recommendations for other service images, and reliability information associated with the service image.

3. The computer-implemented method of claim 2, wherein the pricing information associated with the selected service image comprises at least one of a one-time price associated with the selected service image, a monthly price associated with the selected service image, and an hourly price associated with the selected service image.

4. The computer-implemented method of claim 1, wherein the hosted computing environment, which includes the hosted computing device on which the virtual computing device instance is generated, is at least one of a hosted computing environment associated with a provider of a service image and a hosted computing environment associated with the operator of the electronic catalog.

5. The computer-implemented method of claim 1, wherein the virtual computing device instance is accessed via an application programming interface.

6. The computer-implemented method of claim 1, wherein the selected service image is associated with a usage condition, and wherein providing, to the computing device associated with the customer, access to the virtual computing device instance executing the selected service image comprises determining that the customer has satisfied the usage condition associated with the selected service image and then providing said access.

7. A system comprising:
at least one electronic catalog configured to store a plurality of service images and pricing information associated with each service image of the plurality of service images;
wherein each service image of the plurality of service images, when executed on a hosted computing environment comprising a plurality of host computing devices, implements one or more network accessible services;
and wherein the electronic catalog is accessible to search for one or more service images for execution on a hosted computing environment; and
a computing device in communication with the at least one electronic catalog, the computing device configured to:
generate a user interface that presents to a customer computing device information regarding each service image of the plurality of service images stored in the electronic catalog;
receive from the customer computing device identification of a selected service image selected from the user interface;
receive, from the customer computing device, configuration information;
generate, on behalf of the customer, a virtual computing device instance for the selected service image, wherein the virtual computing device instance is generated on a host computing device of a hosted computing environment;
configure the virtual computing device instance for the selected service image in accordance with the configuration information received from the customer computing device;
cause the virtual computing device instance for the selected service image that is generated on the hosted computing device of the hosted computing environment and configured with the configuration information to execute the selected service image, wherein the selected service image, when executed, implements the one or more network accessible services associated with the selected service image;
monitor usage of the one or more network accessible services associated with the selected service image to determine a usage demand for the one or more network accessible services;
determine that an additional virtual computing device instance is needed to meet the usage demand for the one or more network accessible services;
generate, on behalf of the customer, the additional virtual computing device instance, wherein the additional virtual computing device instance is generated on the host computing device of the hosted computing environment; and
cause the additional virtual computing device instance generated on the host computing device of the hosted computing environment to execute the selected service image.

8. The system of claim 7, wherein the at least one electronic catalog is further configured to store, for each service image of the plurality of service images, usage conditions associated with the service image, and wherein the computing device is further configured to, prior to generating the virtual computing device instance, verify that acceptance of usage conditions associated with the selected service image has been received from the customer computing device.

9. The system of claim 7 wherein the computing device is further configured to receive from the customer computing device identification of additional entities which can access the virtual computing device instance, and transmit, to the virtual computing device instance, information regarding the additional entities.

10. The system of claim 7 further comprising:
a usage monitoring computing device configured to determine a usage of the virtual computing device instance; and
a billing computing device in communication with the usage monitoring computing device, the billing computing device configured to:
determine a cost corresponding to the selected service image based at least in part on the determined usage of the virtual computing device instance and on pricing information associated with the selected service image; and
bill the customer according to the determined cost.

11. The system of claim 10, wherein the billing computing device is further configured to provide a payment to a provider associated with the selected service image, the payment determined based in part on the determined cost.

12. The system of claim 10, wherein the billing computing device is further operative to obtain a payment from the customer according to the determined cost, and provide the payment to a provider associated with the selected service image.

13. The system of claim 7, wherein:
the configuration information received from the customer computing device identifies that multiple virtual computing device instances for the selected service image that are to be generated; and
multiple virtual computing device instances for the selected service image are generated on host computing devices of the hosted computing environment.

14. A computer-readable, non-transitory storage medium having computer-executable modules, the computer-executable modules comprising:
a module in communication with at least one electronic service image catalog configured to store a plurality of service images;

wherein each service image of the plurality of service images, when executed by a hosted computing environment comprising a plurality of host computing devices, implements one or more network accessible services;

wherein the electronic service image catalog is accessible to search for one or more service images for execution on a hosted computing environment;

and wherein the module is configured to:
  generate a user interface that presents to a customer computing device information regarding each service image of the plurality of service images stored in the electronic service image catalog, wherein the information for each service image of the plurality of service images comprises a price associated with the service image;
  receive from the customer computing device identification of a selected service image selected from the user interface;
  receive, from the customer computing device, configuration information;
  generate, on behalf of a customer associated with the customer computing device, a virtual computing device instance for the selected service image, wherein the virtual computing device is generated on a host computing device of a hosted computing environment;
  configure the virtual computing device instance for the selected service image in accordance with the configuration information received from the customer computing device;
  cause the virtual computing device instance for the selected service image that is generated on the hosted computing device of the hosted computing environment and configured with the configuration information to execute the selected service image, wherein the selected service image, when executed, implements the one or more network accessible services associated with the selected service image;
  provide, to the customer computing device, access to the virtual computing device instance executing the selected service image;
  monitor usage of the one or more network accessible services associated with the selected service image to determine a usage demand for the one or more network accessible services;
  determine that an additional virtual computing device instance is needed to meet the usage demand for the one or more network accessible services;
  generate, on behalf of the customer, the additional virtual computing device instance, wherein the additional virtual computing device instance is generated on the host computing device of the hosted computing environment; and
  cause the additional virtual computing device instance generated on the host computing device of the hosted computing environment, to execute the selected service image.

15. The computer-readable, non-transitory medium of claim 14, wherein the user interface further includes, for each service image of the plurality of service images, information associated with the service image, the information corresponding to at least one of a price associated with the service image, reviews of the service image, recommendations for other service images, and reliability information associated with the service image.

16. The computer-readable, non-transitory medium of claim 15, wherein the price associated with the selected service image corresponds to at least one of a one-time price associated with the selected service image, a monthly price associated with the selected service image, and an hourly price associated with the selected service image.

17. The computer-readable, non-transitory medium of claim 14 wherein the module is further configured to receive from the customer computing device identification of additional entities which can access the virtual computing device instance, and transmit, to the virtual computing device instance, information regarding the additional entities.

18. The computer-readable, non-transitory medium of claim 14, wherein the computer-executable modules further comprise:
  a usage monitoring module configured to determine a usage of the virtual computing device instance; and
  a billing module in communication with the usage monitoring module, the billing module configured to:
    determine a cost corresponding to the selected service image based at least in part on the determined usage of the virtual computing device instance and on pricing information associated with the selected service image; and
    bill the customer associated with the customer computing device according to the determined cost.

19. The computer-readable, non-transitory medium of claim 18, wherein the billing module is further configured to obtain a payment from the customer according to the determined cost, and provide a payment to a provider associated with the selected service image.

20. The computer-readable, non-transitory medium of claim 15, wherein:
  the configuration information received from the customer computing device identifies that multiple virtual computing device instances for the selected service image are to be generated; and
  the multiple virtual computing device instances for the selected service image are generated on host computing devices of the hosted computing environment.

21. A computer-implemented method comprising:
  maintaining a searchable electronic catalog comprising a plurality of service images, wherein each service image of the plurality of service images, when executed on a hosted computing environment comprising a plurality of host computing devices, implements one or more network accessible services associated with the service image of the plurality of service images;
  in response to a first request from a customer computing device, transmitting to the customer computing device information regarding at least one service image of the plurality of service images stored in the searchable electronic catalog for presentation on the customer computing device;
  receiving from the customer computing device identification of a selected service image selected from the searchable electronic catalog;
  receiving from the customer computing device configuration information;
  generating, on behalf of the customer, a virtual computing device instance on a host computing device of a hosted computing environment;
  configuring the virtual computing device instance in accordance with the configuration information received from the customer computing device;
  causing the virtual computing device instance that is generated on the hosted computing device of the hosted computing environment and configured with the configuration information to execute the selected service image, wherein the selected service image, when executed, implements the one or more network accessible services associated with the selected service image;

providing, to the customer computing device, access to the virtual computing device instance executing the selected service image;

monitoring usage of the one or more network accessible services associated with the selected service image to determine a usage demand for the one or more network accessible services;

determining that an additional virtual computing device instance is needed to meet the usage demand for the one or more network accessible services;

generating, on behalf of the customer, the additional virtual computing device instance, wherein the additional virtual computing device instance is generated on the host computing device of the hosted computing environment; and causing the additional virtual computing device instance generated on the host computing device of the hosted computing environment, to execute the selected service image.

22. The computer-implemented method of claim 21, wherein the maintained searchable electronic catalog further comprises, for each service image of the plurality of service images, at least one of pricing information associated with the service image and usage conditions associated with the service image.

23. The computer-implemented method of claim 21, wherein the hosted computing environment including the host computing device on which the virtual computing device instance is generated, is at least one of a hosted computing environment associated with a provider of a service image and a hosted computing environment associated with the searchable electronic catalog.

24. The computer-implemented method of claim 1, wherein the configuration information comprises at least one a type of hosted computing environment on which the service image is to be executed, a version of the selected service image, a number of virtual computing devices to be generated for the selected service image, or a type of virtual computing device to be generated for the selected service image.

* * * * *